April 19, 1960   J. M. HAIT ET AL   2,933,174
APPARATUS FOR ORIENTING INDENTED FRUIT
Original Filed Nov. 26, 1948   14 Sheets-Sheet 5

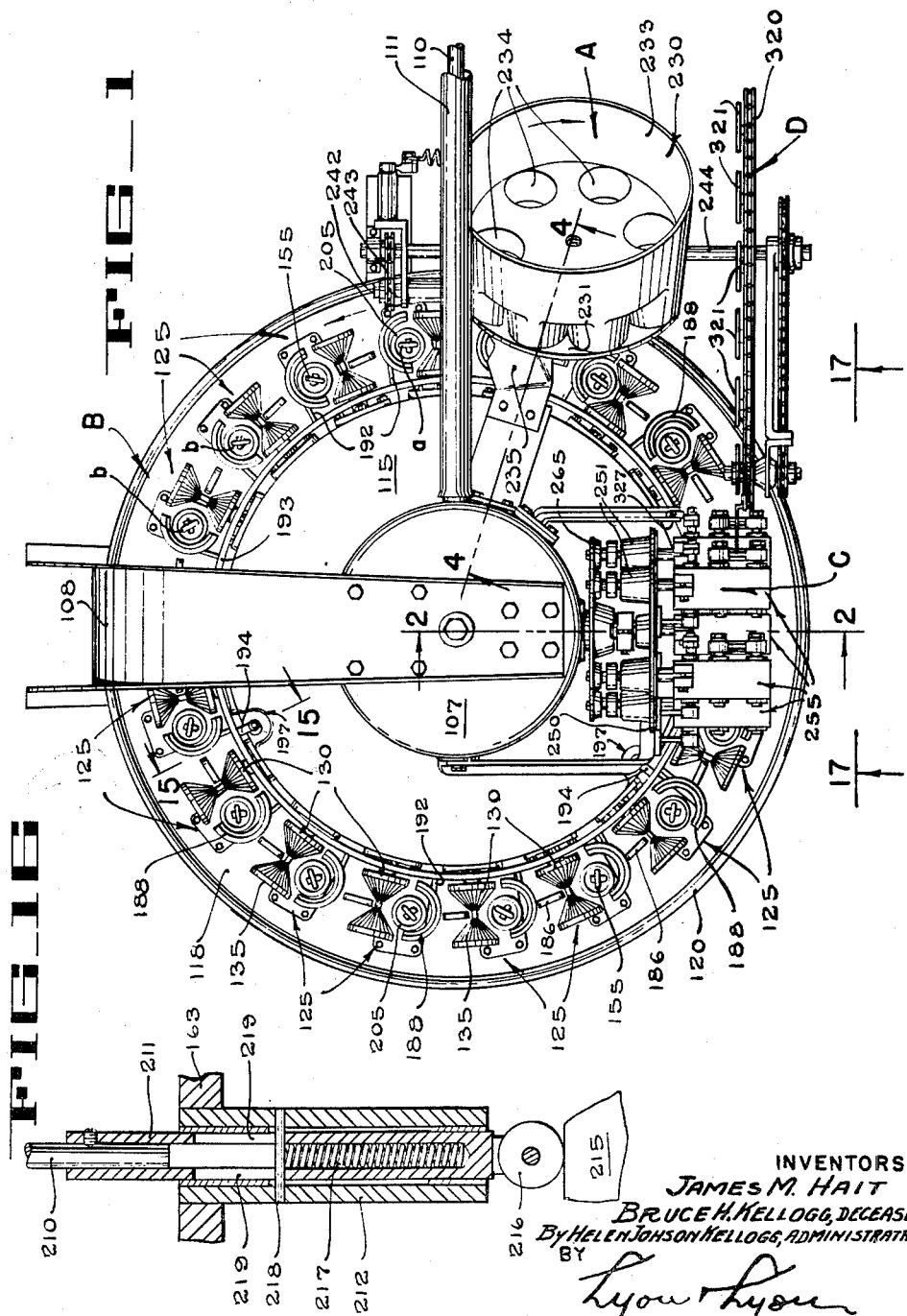

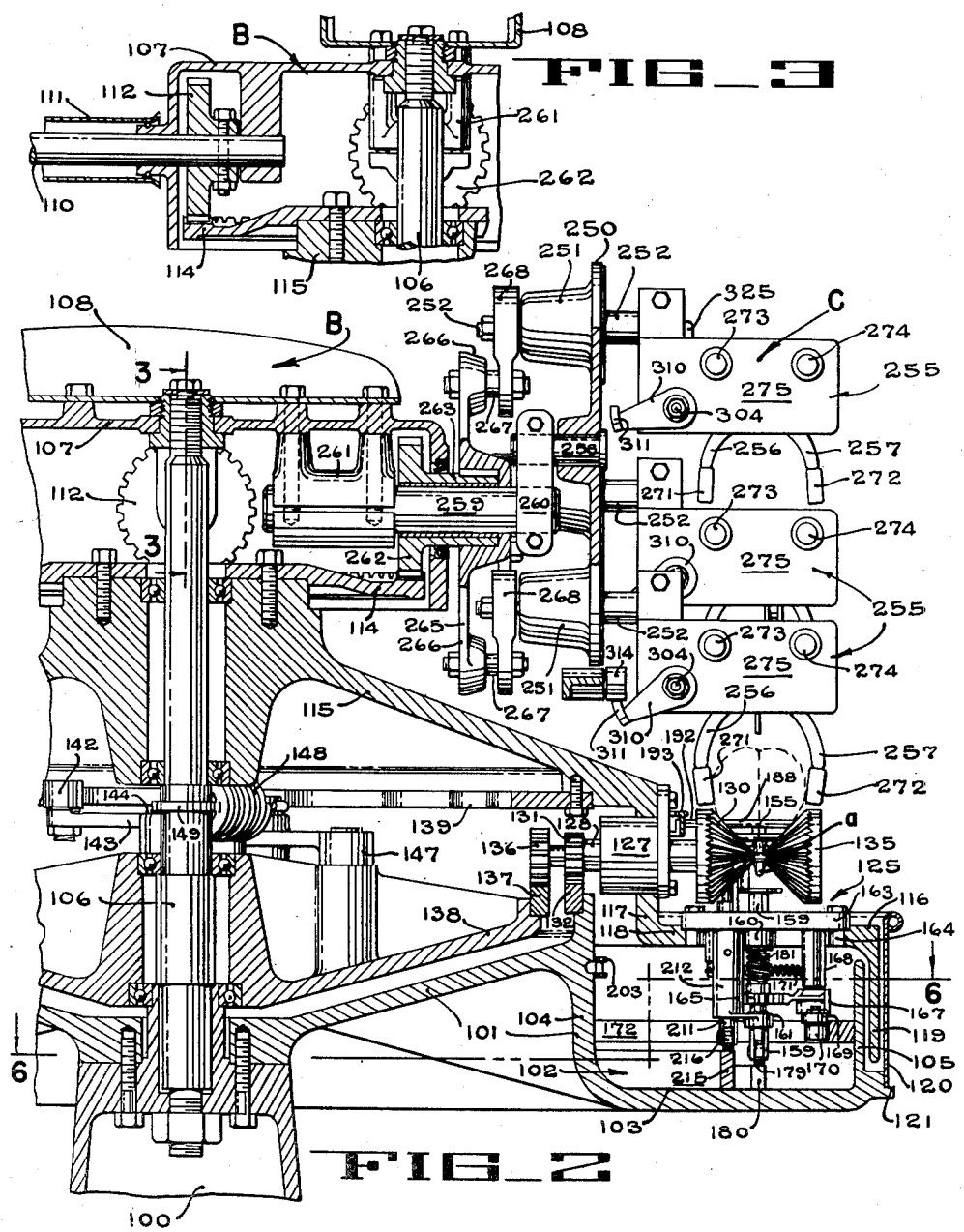

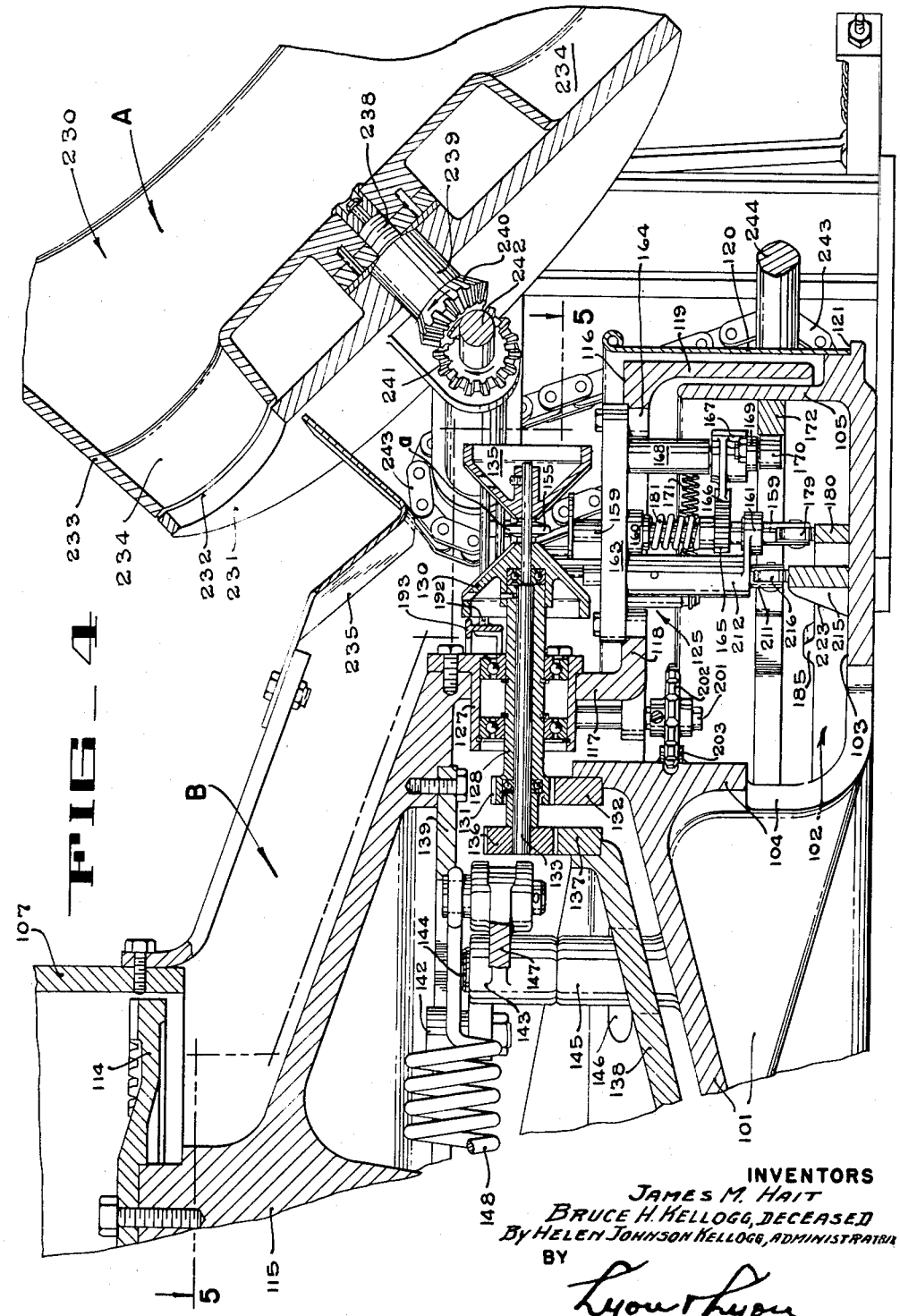

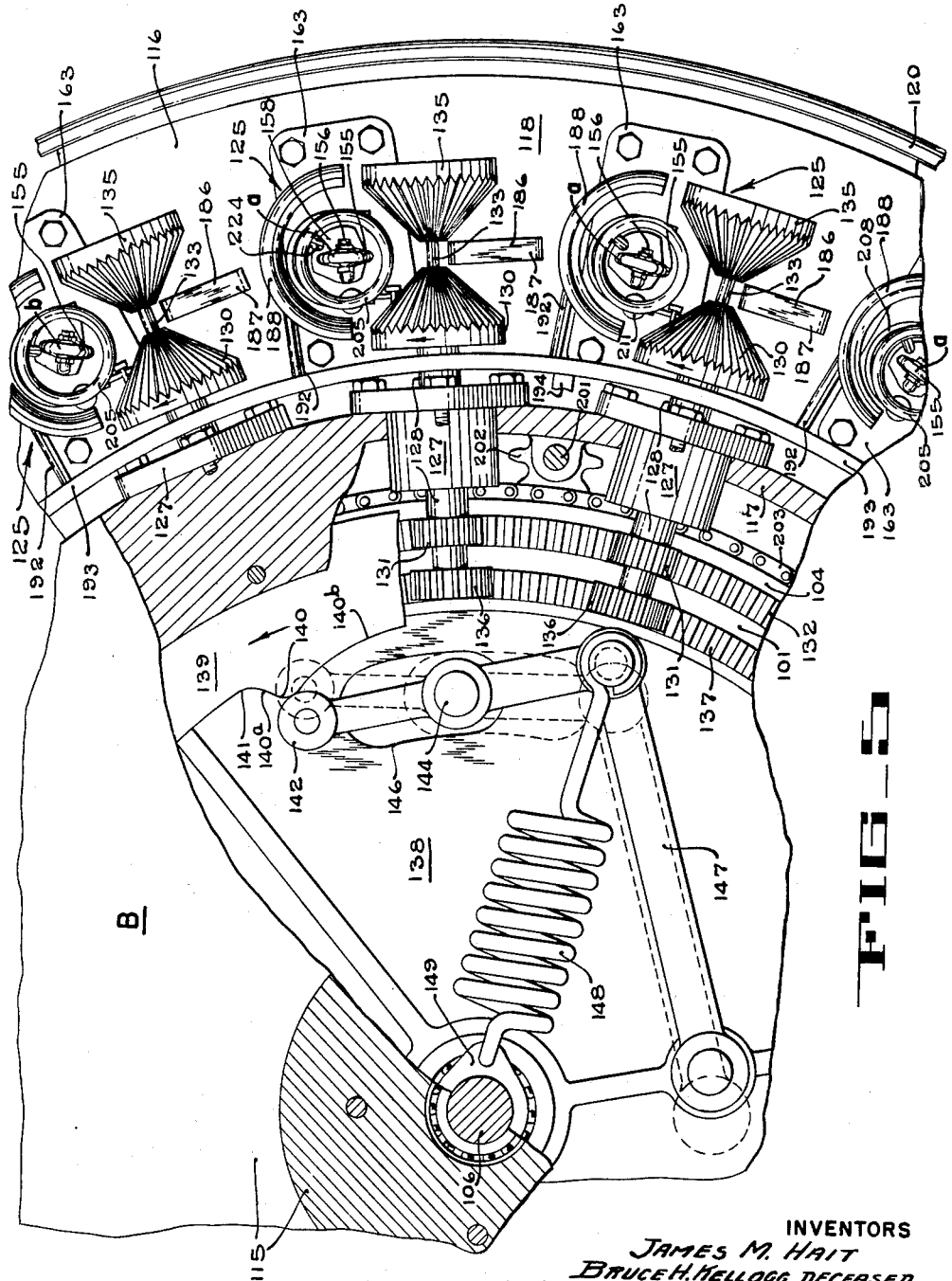

FIG_6

FIG_10

INVENTORS
JAMES M. HAIT
BRUCE H. KELLOGG, DECEASED
By HELEN JOHNSON KELLOGG, ADMINISTRATRIX
BY
Lyon Lyon
ATTORNEYS

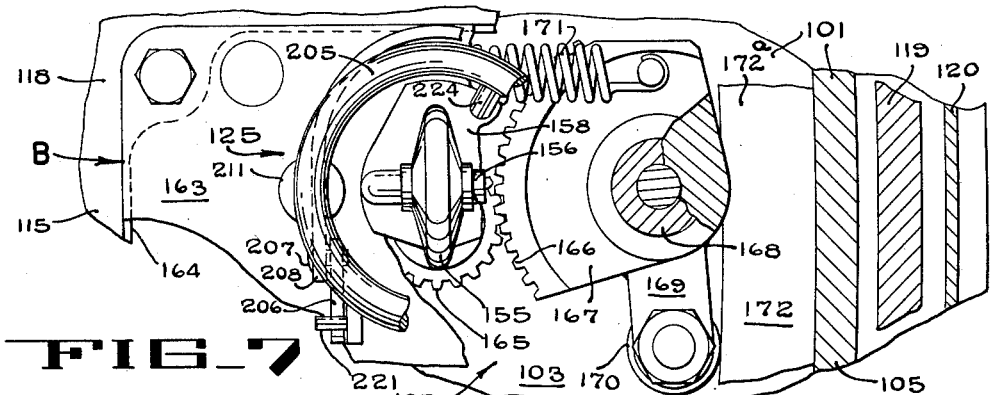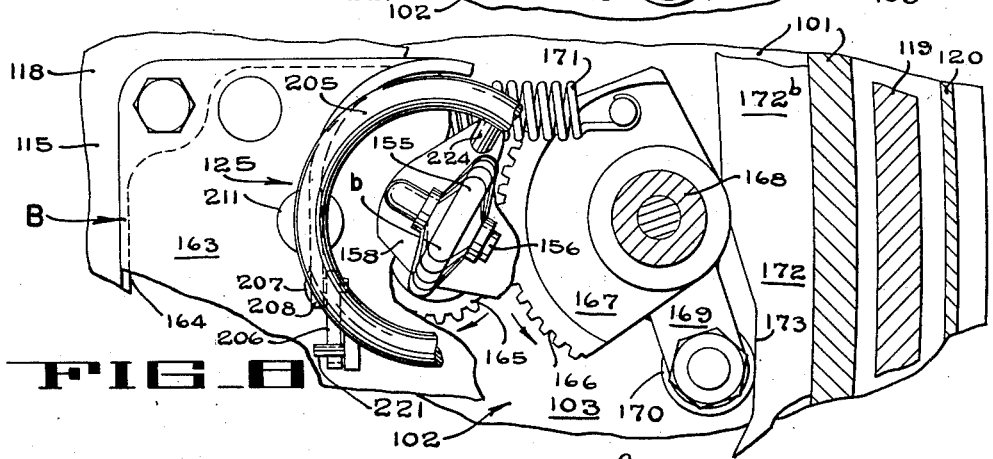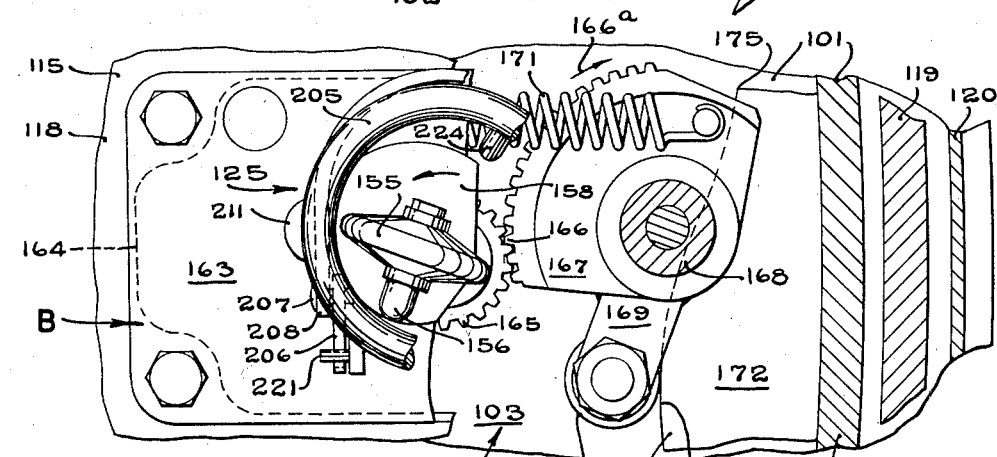

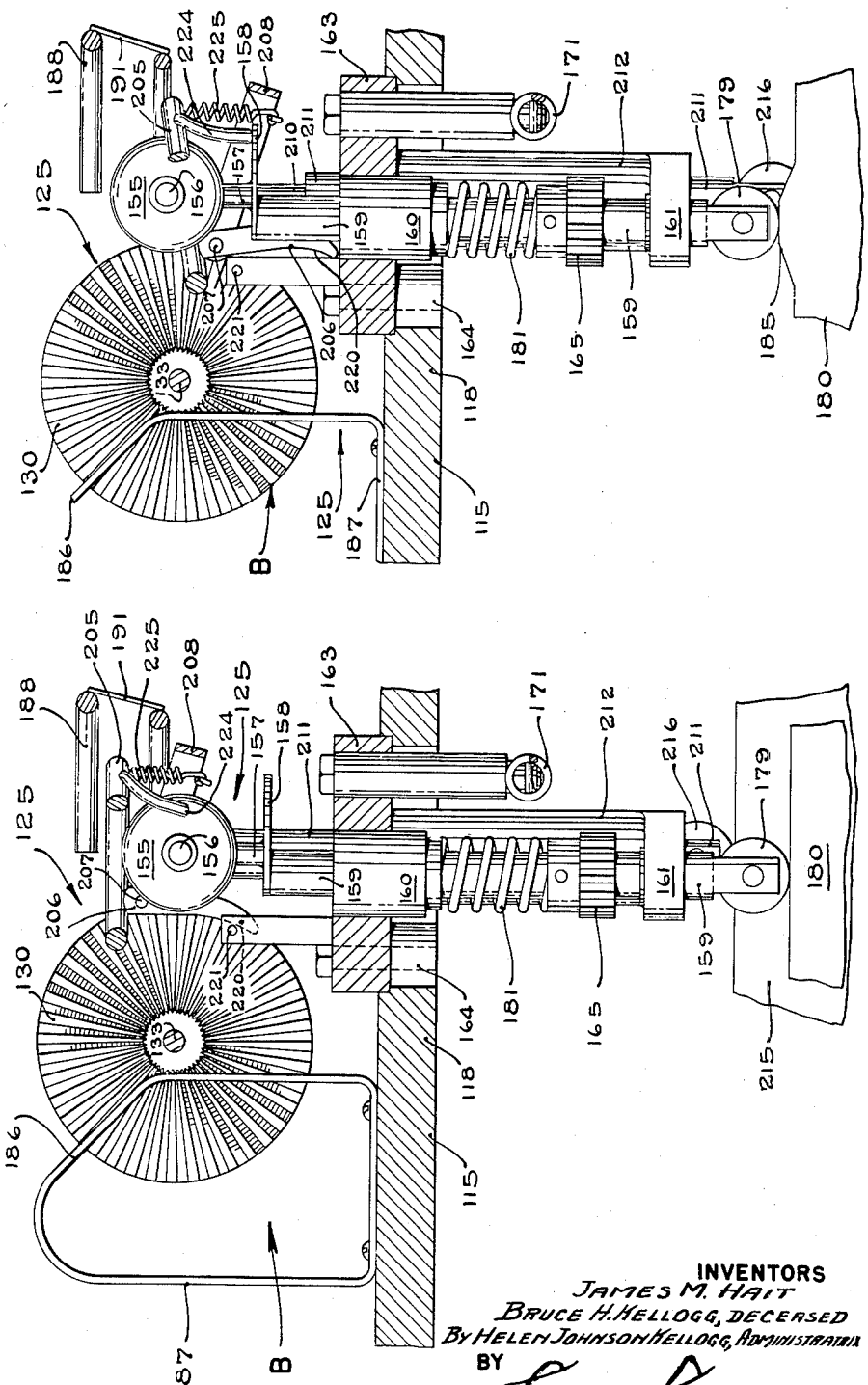

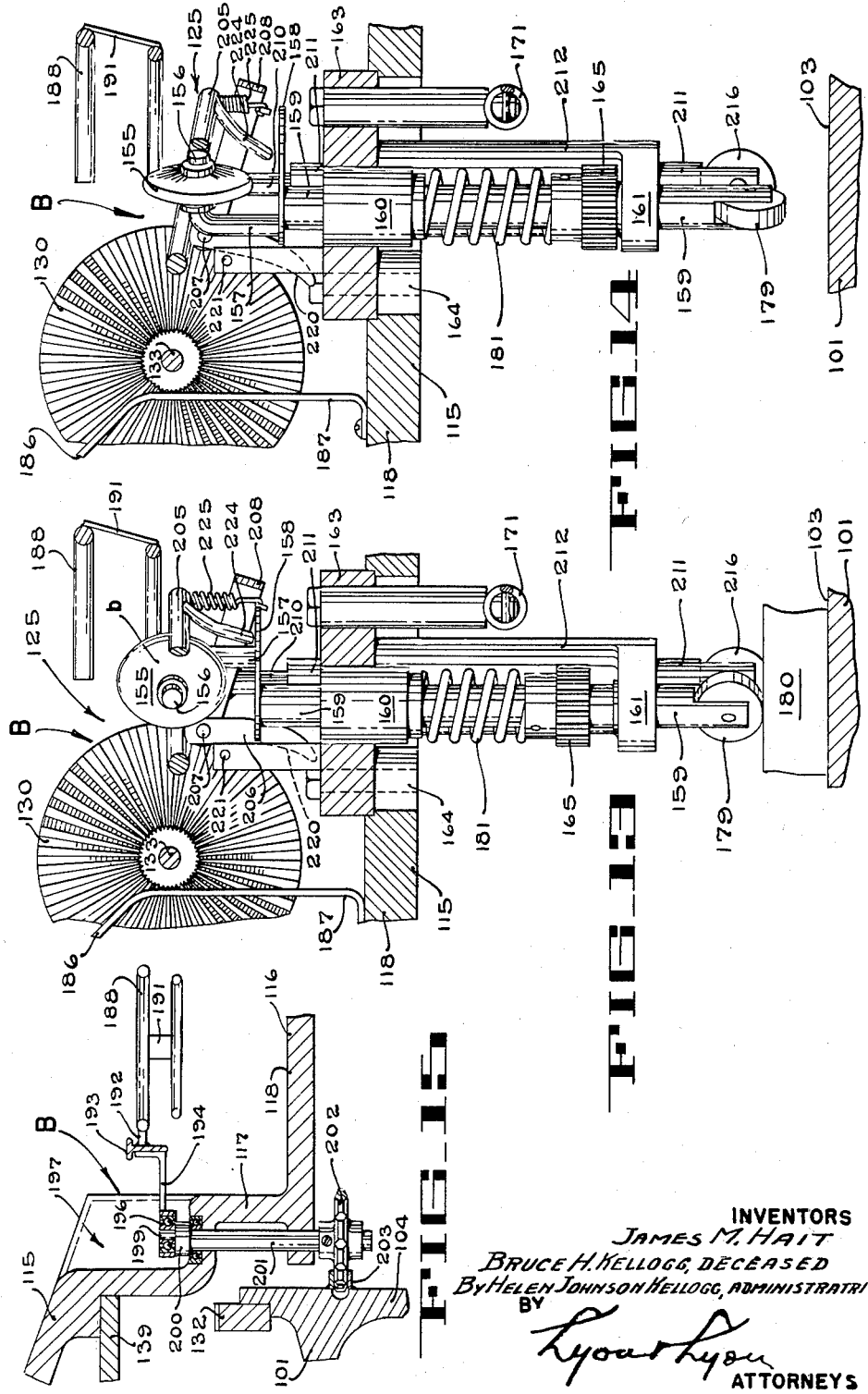

April 19, 1960 J. M. HAIT ET AL 2,933,174
APPARATUS FOR ORIENTING INDENTED FRUIT
Original Filed Nov. 26, 1948 14 Sheets-Sheet 9
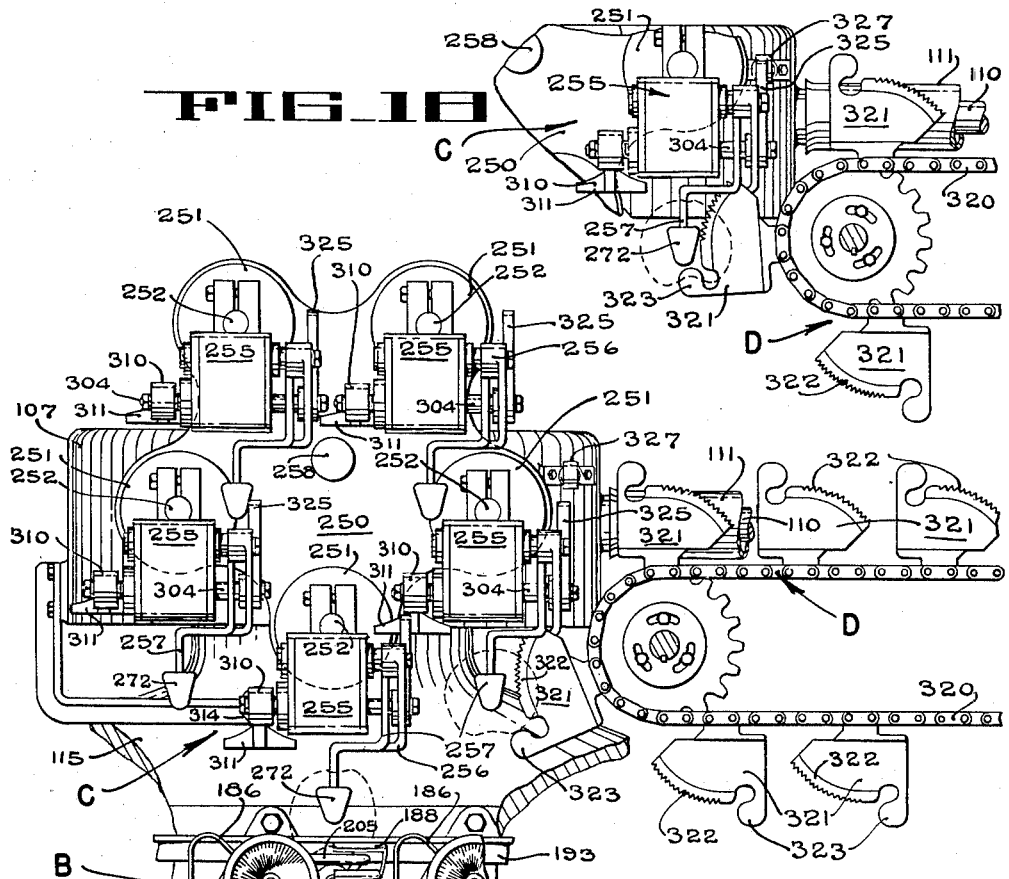
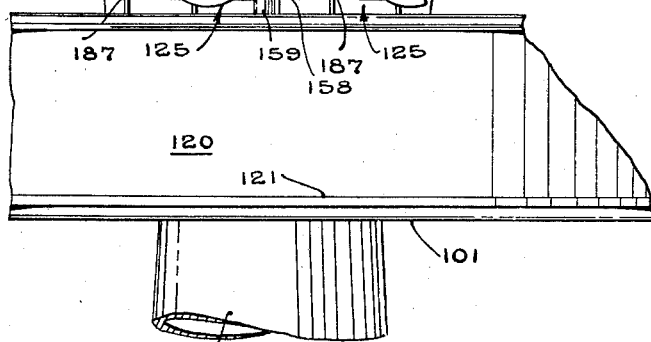
INVENTORS
JAMES M. HAIT
BRUCE H. KELLOGG, DECEASED
BY HELEN JOHNSON KELLOGG, ADMINISTRATRIX
BY
Lyon & Lyon
ATTORNEYS April 19, 1960   J. M. HAIT ET AL   2,933,174
APPARATUS FOR ORIENTING INDENTED FRUIT
Original Filed Nov. 26, 1948   14 Sheets-Sheet 10
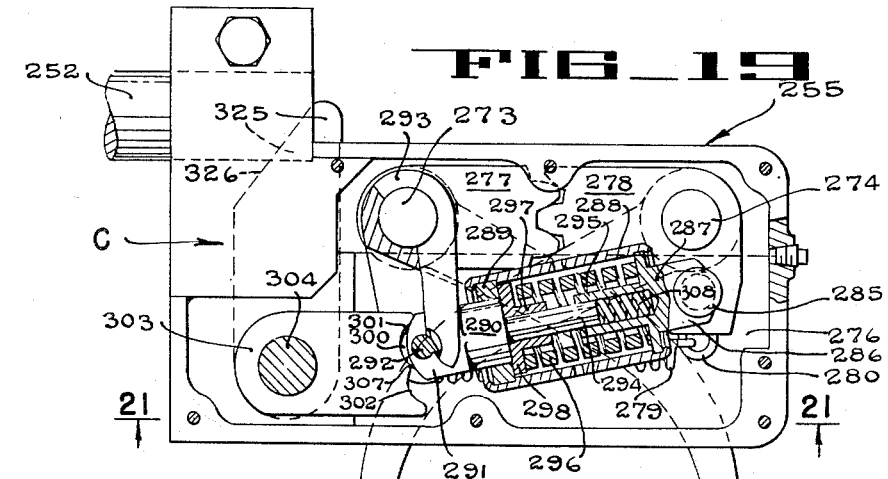
FIG_19
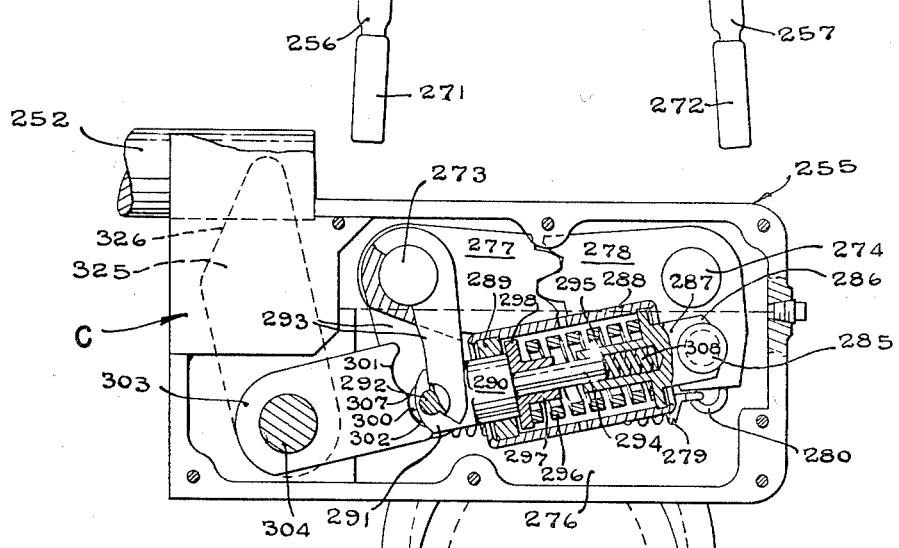
FIG_20
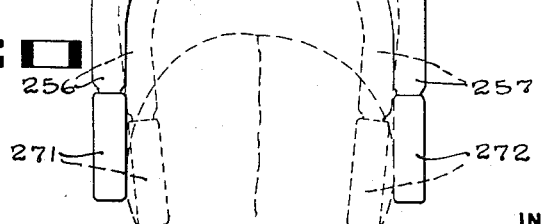
INVENTORS
JAMES M. HAIT
BRUCE H. KELLOGG, DECEASED
By HELEN JOHNSON KELLOGG
Administratrix
BY
Lyon & Lyon
ATTORNEYS

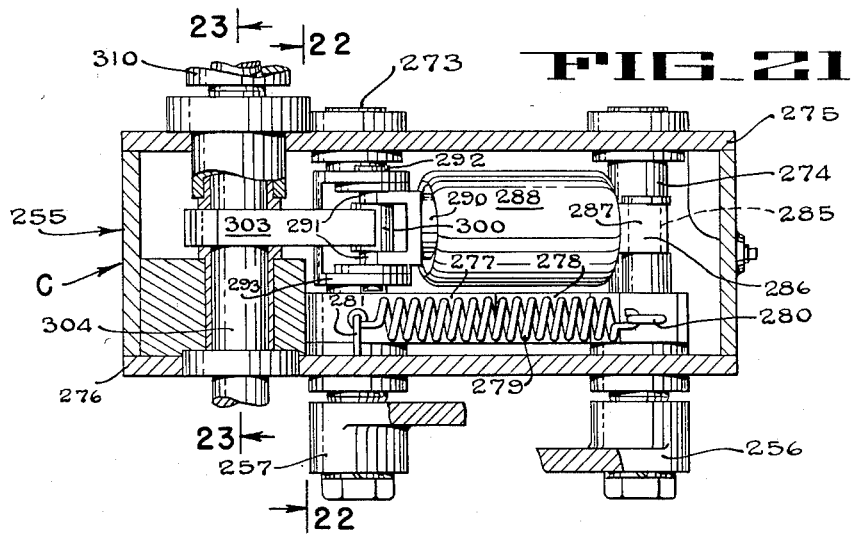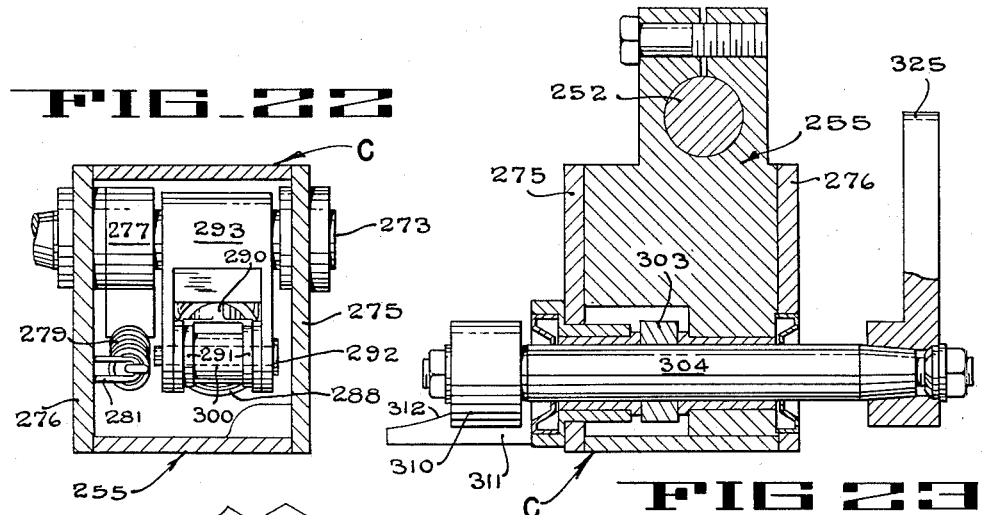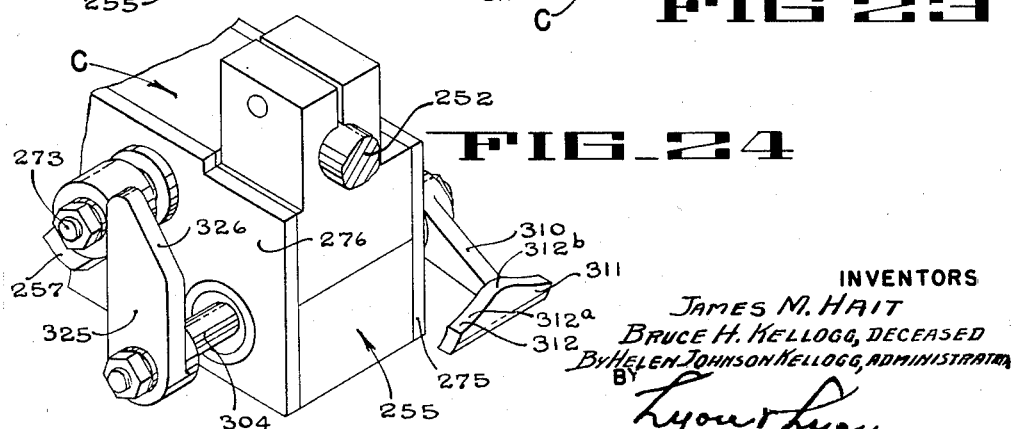

April 19, 1960     J. M. HAIT ET AL     2,933,174
APPARATUS FOR ORIENTING INDENTED FRUIT
Original Filed Nov. 26, 1948     14 Sheets-Sheet 12
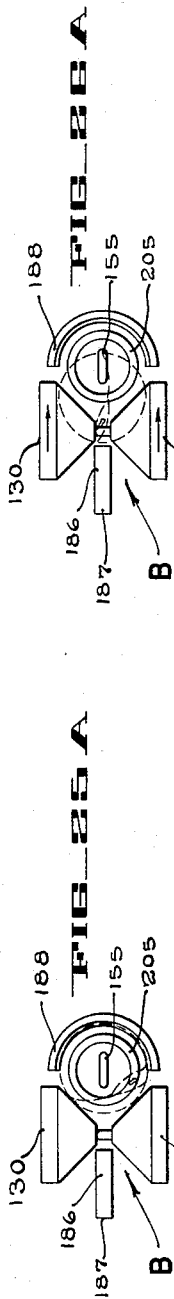
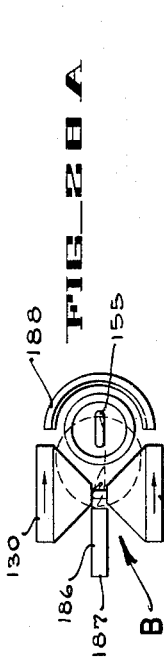
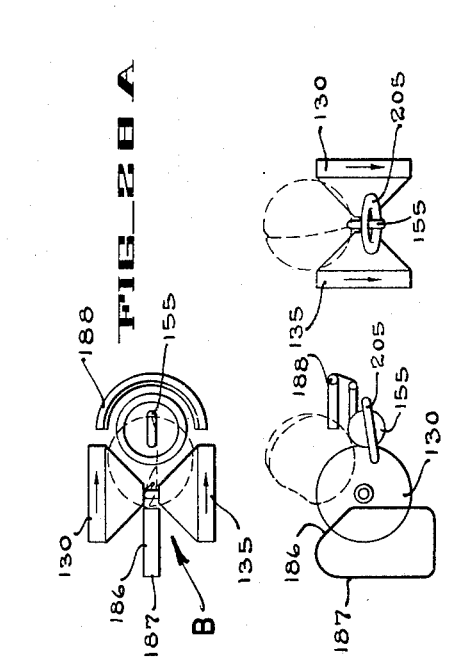
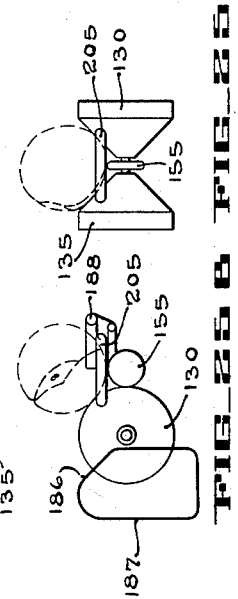
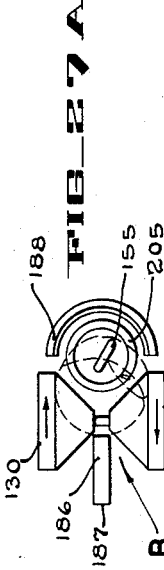
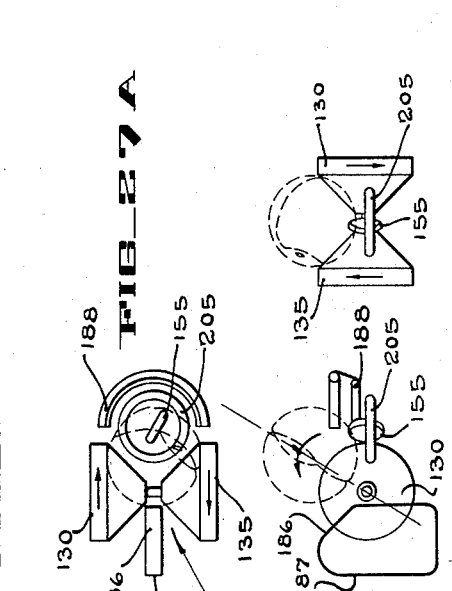
INVENTORS
JAMES M. HAIT
BRUCE H. KELLOGG, DECEASED
BY HELEN JOHNSON KELLOGG, ADMINISTRATRIX
BY Lyon & Lyon
ATTORNEYS

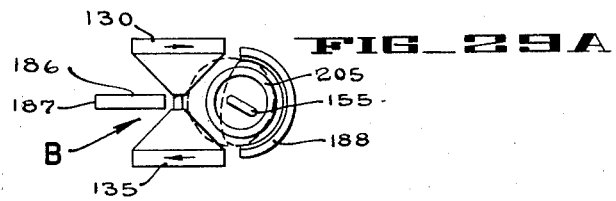
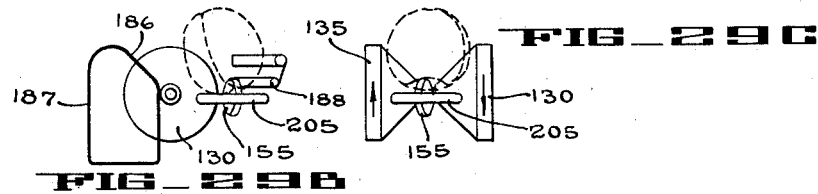
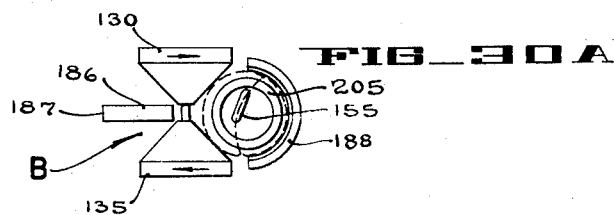
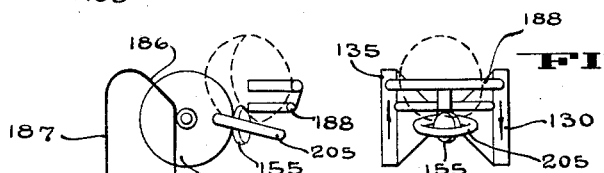
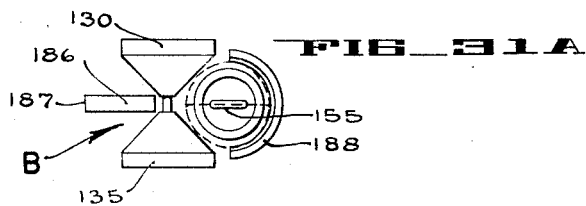
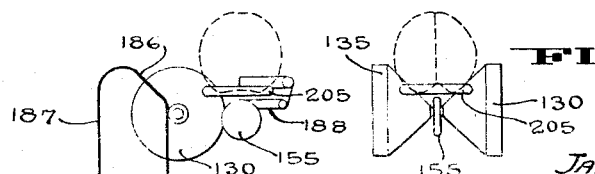

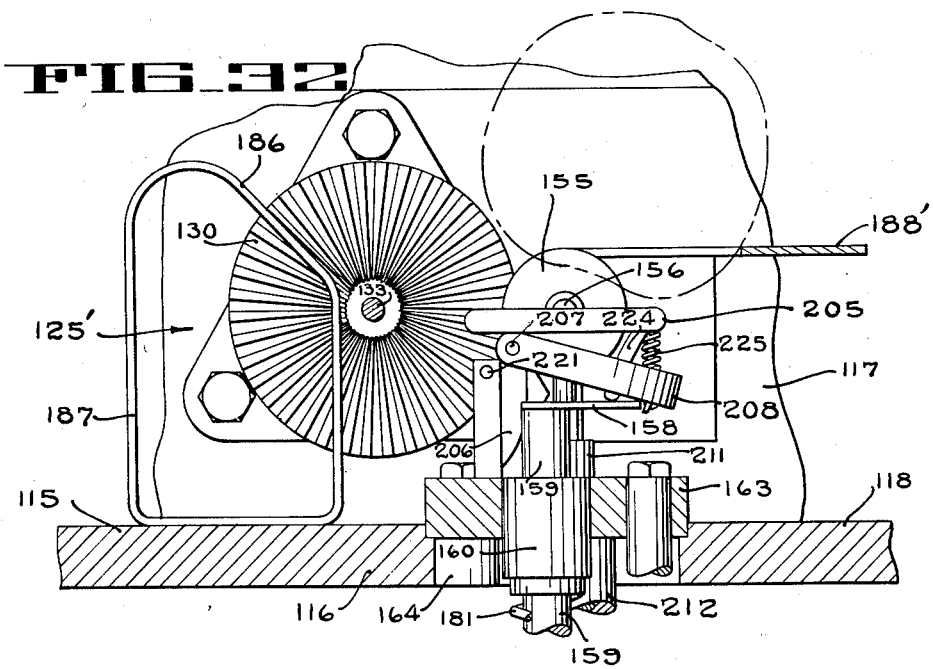
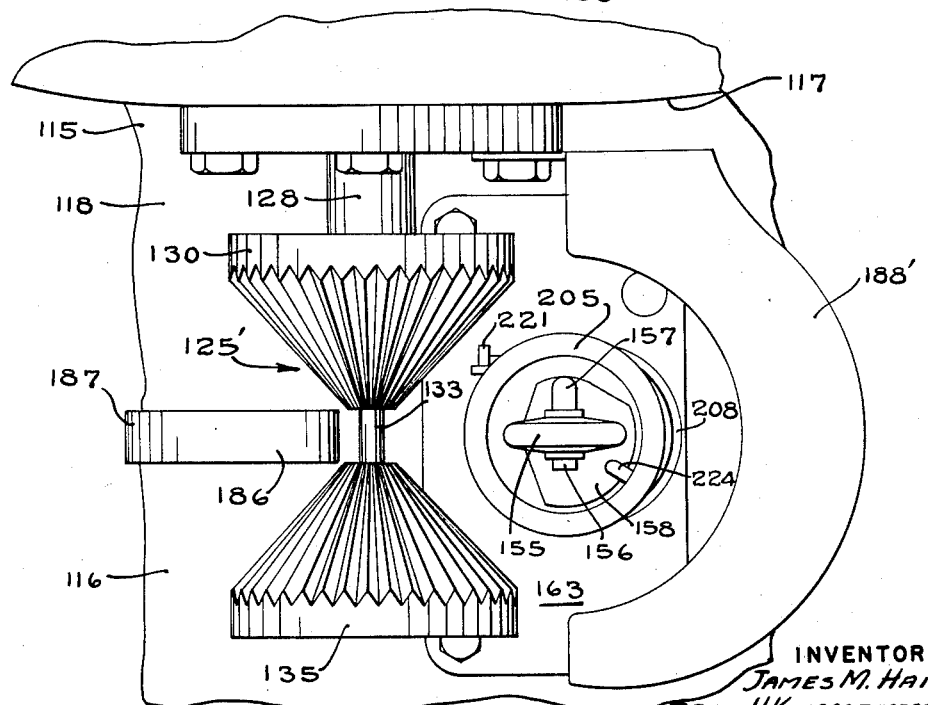

2,933,174

APPARATUS FOR ORIENTING INDENTED FRUIT

James M. Hait, San Jose, Calif., and Bruce H. Kellogg, deceased, late of Los Gatos, Calif., by Helen Johnson Kellogg, administratrix, Los Gatos, Calif., assignors, by mesne assignments, to Food Machinery and Chemical Corporation, San Jose, Calif., a corporation of Delaware Original application November 26, 1948, Serial No. 62,046. Divided and this application February 23, 1952, Serial No. 273,094

8 Claims. (Cl. 198—33)

The principle of the invention is herein explained and also the best mode in which it is contemplated applying that principle so as to distinguish it from other inventions.

The present invention relates to fruit orienting methods and apparatus and particularly to methods and apparatus for handling fruit having a meridional seam or suture line which expands into a pronounced indent or cavity at the stem end thereof, such as peaches, apricots, and the like. For such fruit to be neatly pitted and sliced into its natural halves in a fruit preparation machine, it is necessary that it be first positioned with its stem blossom axis pointing in a predetermined direction and its seam or suture extending within a predetermined plane.

One object of the present invention is to provide methods of, and apparatus for, handling fruit of the kind referred to, in a manner that will dependably secure a predetermined orientation of the stem blossom axis of the fruit.

Another object is to provide methods of, and apparatus for, orienting fruit of the kind referred to in a manner that will quickly and dependably align the seam or suture of the fruit within a predetermined plane.

Another object is to provide methods of and apparatus for orienting peaches, and like fruit, in such a manner that their stem blossom axes assume a predetermined position with the stem indents pointing in a predetermined direction, and the seams or sutures disposed within a predetermined plane.

Another object is to provide mechanism causing the surface of a peach, or like fruit, to be systematically scanned by a finder element until the stem indent of said fruit will be engaged by said finder element.

A further object is to provide means for seating a fruit, of the type referred to, with its stem indent upon an indent finder element, while preventing other indents or dimples that may exist in the surface of said fruit from permanently seating themselves upon said finder element.

Another object is to provide an orienting mechanism of such type that a fruit will automatically disengage itself from the effect of said mechanism whenever orientation has been accomplished.

Another object is to provide orienting mechanisms, of the type referred to, which are fast in operation and capable of processing large quantities of fruit in a minimum of time without undue complexity in construction.

A further object of the present invention is to provide automatic means for transferring peaches, or like fruit, from orienting mechanisms of the type described to a fruit preparation machine without impairment of the established orientation.

Another object is to provide transfer mechanisms adapted to automatically grip a peach, or like fruit, at either side of its suture plane, upon termination of the orienting process, and to release said fruit automatically upon presentation thereof to the processing station of a fruit preparation machine.

Another object is to provide an automatic transfer mechanism for fruit of variable size, which is adapted to firmly grip such fruit whether the gripped specimen be large or small.

A further object is to provide a transfer mechanism, of the type referred to, that will firmly grip the smallest specimen of the fruit for which it is designed, yet will cause no injury to the larger specimens thereof.

These and other objects and advantages of the present invention will become apparent from the following description and drawings in which:

Figure 1 is a plan view of the fruit orienting machine of the present invention.

Figure 2 is an enlarged vertical section of a portion of the machine taken along line 2—2 of Figure 1.

Figure 3 is a fragmentary view, partly in elevation and partly in section, of the power train of the machine taken along line 3—3 of Figure 2.

Figure 4 is a vertical section of another portion of the machine taken along line 4—4 of Figure 1.

Figure 5 is a substantially horizontal section of the machine taken along line 5—5 of Figure 4.

Figure 6 is a reduced horizontal section through the stationary base portion of the machine taken along line 6—6 of Figure 2, certain parts being omitted.

Figures 7, 8, 9, and 10 are enlarged fragmentary plan views of one of the orienting units of the machine in different operational positions.

Figures 11, 12, 13, and 14 are fragmentary side views, partly in elevation and partly in section, of the same orienting unit in different operational positions.

Figure 15 is an enlarged detail view, partly in section and partly in elevation, illustrating the actuating mechanism of one of the components of an orienting unit, taken along line 15—15 in Figure 1.

Figure 16 is a detail view showing a vertical section through the control mechanism of another one of the components of such an orienting unit.

Figure 17 is an enlarged side elevation of a portion of the machine viewed in the direction of the arrows 17—17 of Figure 1 and illustrating the station at which the oriented fruit is transferred onto an endless conveyor belt equipped with impaling knives.

Figure 18 is a fragmentary detail view in elevation, similar to Figure 17, illustrating a slightly different phase in the transfer process of the fruit from the orienting mechanism onto the impaling knives.

Figures 19 and 20 are enlarged longitudinal vertical sections through the gripping mechanism of a transfer unit in different operational positions.

Figure 21 is a section of the same transfer unit taken along line 21—21 of Fig. 19.

Figure 22 is a cross section through the transfer unit taken along line 22—22 of Figure 21, certain parts being omitted.

Figure 23 is another cross section through the transfer unit taken along line 23—23 of Figure 21.

Figure 24 is a fragmentary perspective of the transfer unit.

Figures 25A, B, and C to Figures 31A, B, and C, inclusive, are sets of diagrammatical illustrations of a fruit orienting unit (A) in plan view, (B) in side elevation, and (C) in front elevation, with each of said sets illustrating a different operational position of said unit.

Figure 32 is a fragmentary side view partly in section of a modified orienting unit constructed in accordance with the invention.

Figure 33 is a plan view of the same modified oreinting unit.

This application is a division of the patent application, Serial No. 62,046 for Method of and Apparatus for Orienting Indented Fruit, filed November 26, 1948.

As best shown in Figure 1, the machine of the present invention illustrated in the accompanying drawings comprises an automatic feed hopper A, a fruit orienting mechanism B, and a transfer mechanism C which delivers the oriented fruit onto a conveyor D of a fruit preparation machine. The conveyor D illustrated herein is of the type carrying an endless sequence of impaling knives, as will be described in greater detail hereinafter.

The fruit orienting machine (Figure 2) comprises a stationary base 100 to which is bolted a disc-like casting 101. The peripheral area of said casting is formed in the manner of an annular channel or runway 102 having a flat bottom 103 and substantially vertical walls 104 and 105, as best shown in Figures 2 and 4. Mounted upon the base 100 concentrically with the circular casting 101 is a vertically disposed stationary shaft 106 which carries upon its upper end a dome or cupola 107 of cast iron, or the like. For added support, said cupola is bolted to the upper shank of a yoke member 108 (Figures 1, 2, and 6) which holds it securely in a horizontal position parallel to the disc 101 and is, in turn, rigidly supported from the stationary base 100.

Suitably journalled in the side wall of the cupola 107 (Figures 1 and 3) is a radically disposed drive-shaft 110, the exterior portion of which may be covered by a suitable metal sheath 111. Interiorly of the cupola 107 a vertically positioned gear 112 is keyed upon the drive shaft 110 and meshes with a horizontally positioned gear wheel 114 which is loosely arranged around the stationary main shaft 106 and is bolted to the upper face of another disc-like casting 115 rotatably disposed around said vertical shaft 106. This casting will hereinafter be referred to as the rotor or turret 115.

The edge of said turret 115 (Figures 2 and 4) is formed in the manner of a two-stepped lip 116 which overlaps the channel 102 of the stationary disc 101 and has an inner vertically depending portion 117 spaced radically from the inner wall 104 of said channel, a horizontal portion 118 extending parallel to the bottom 103 of said channel beyond the outer wall 105 thereof, and an outer vertically depending end portion 119. To protect attending personnel from said outer lip portion 119 (Figures 2, 4, and 17) when the turret 115 is in motion, an annular steel guard 120, suitably seated upon a rim or shoulder 121 projecting radially from the bottom of the stationary outer channel wall 105, may be arranged around said outer lip portion 119.

Mounted in and upon the outer lip 116 of the turret 115 for continuous movement around the center shaft 106 are numerous fruit orienting units 125 spaced equal angular intervals apart, as best shown in Figure 1. Each of said fruit orienting units 125 is formed by a plurality of components which are actuated by movement of the turret 115 relative to the stationary disc 101 to perform characteristic motions that cooperate to rock and turn a peach or like fruit placed thereon systematically in such a manner that it will eventually assume a desired position with its stem blossom axis disposed in a predetermined direction and its seam aligned with a predetermined plane.

For this purpose, the cylindrical wall formed by the inner depending portion 117 of the turret 115 is provided with a plurality of circumferentially spaced apertures and firmly seated in each of said apertures is a bearing 127 within which is rotatably arranged a radially extending tubular shaft 128, as shown in Figure 4. Secured to the outer end of said shaft 128 is a fluted cone 130 with its peak pointing in outward direction (Figures 2 and 5) and the inner end of said shaft carries a pinion 131 which meshes with a circular rack 132 mounted on top of the inner channel wall 104 formed in the stationary disc 101. Thus, whenever operation of the drive shaft 110 turns the turret 115 in counterclockwise direction (as viewed in Figure 5), the pinion 131 and, hence, the shaft 128 with the fluted cone 130 are turned in clockwise direction, as viewed from the periphery of the machine.

Rotatably disposed within the interior of the tubular shaft 128 and projecting beyond said shaft at either end thereof is another shaft or spindle 133. The outer end of said shaft 133 carries a similar fluted cone 135 positioned adjacent to cone 130 with its peak pointing in opposite direction, as illustrated in Figure 5, and keyed to the inner end of said shaft is a pinion 136 which meshes with another circular rack 137, as shown in Figures 2 and 4.

During the operation of the machine, this second rack 137 is caused to turn in alternate directions over an arc of limited angular width, and for this purpose said rack is mounted upon the edge of another disc-like casting 138 which is disposed between the turret 115 and the stationary disc 101 and is arranged to oscillate around the stationary main shaft 106. During operation of the machine, said oscillating disc 138 is actuated by a cam arrangement that comprises an internal cam 139 which is bolted to the underside of the turret 115, as shown in Figure 2, and the inner contour of which has somewhat the appearance of a circular saw possessing a continuous sequence of inwardly directed peaks 140 and outwardly receding depressions 141, as best shown in dotted lines in Figure 6. This cam 139 is engaged by the roller 142 of a cam follower lever 143 which turns on a stud 144 mounted in a boss 145, that is integral with the stationary disc 101 and protrudes upwardly through an arcuate slot 146 in the oscillating disc 138. A link 147 pivoted at opposite ends to the disc 138 and the free end of the lever 143, respectively, operatively connects said disc to the described cam arrangement and a contraction spring 148 tensioned between a washer 149 turning on the main shaft 106 and the pivotal connection between link 147 and cam follower lever 143 maintains the roller 142 in contact with the contour of the cam 139.

During operation of the machine, the turret 115 and, hence, the cam 139 are turned constantly in one direction, which may be the counterclockwise direction as viewed in Figure 5, and, as a result thereof, the roller 142 is forced to negotiate the cam peaks 140 and the depressions 141 in continuous succession. Every time said roller ascends a peak 140, the cam follower lever 143 is turned in counterclockwise direction and pulls the disc 138 in the direction of movement of the turret 115 over an arc determined by the altitude of said peak 140. Figure 5 illustrates in full lines the condition of the described cam follower mechanism when the disc 138 is in its extreme counterclockwise position, as indicated by the fact that the clockwise end of the arcuate slot 146 is almost in contact with the stationary boss 145. As soon as the roller 142 descends from the peak 140, however, the spring 148 returns the disc 138 to a clockwise position which is determined by the depth of the cam depression 141. In Figure 5, this latter position is represented in broken lines which show that it is now the counterclockwise end of the arcuate slot 146 which is almost in contact with the stationary boss 145. Hence, during the peak ascending phase of the cyclic cam follower movements, the rack 137 shifts in counterclockwise direction which reduces the rotational speed of the pinions 136 that are enmeshed with and travel in counterclockwise direction upon said rack. In the preferred embodiment of our invention, as illustrated in the accompanying drawings, the ascending slope 140a of the peaks 140 is actually of such steepness that the counterclockwise shift of the inner rack occurs at a greater angular speed than the counterclockwise motion of the turret 115 so that the pinions 136 will actually reverse their direction of rotation for a brief period of time.

During the descending phase of the cyclic cam follower movements, however, the inner rack 137 is returned to its clockwise position at a speed determined by the grade of the descending slope 140b causing the pinions 136 to turn at a faster rate in clockwise direction than the rate at which they would turn if the rack 137 were stationary.

In the illustrated embodiment of the present invention the descending slopes 140b are so graded that the pinions 136 will turn in clockwise direction at substantially the same speed as the outer pinions 132 irrespective of the greater diameter of the outer circular rack relative to its associated pinions which would normally cause said outer pinions to turn at a faster rate than the pinions enmeshed with the inner rack. Hence, as the turret 115 revolves around the main shaft 106, the inner cones 130 will steadily turn in clockwise direction, but the outer cones, while mostly turning in clockwise direction at the same speed as the inner cones, will intermittently reverse their movement for brief periods at a frequency determined by the number of peaks and depressions that are provided along the circumference of the cam 139.

Associated with each pair of fluted cones 130, 135 is a vertically positioned disc or wheel 155 which is located within the symmetrical plane of said cones a predetermined horizontal distance in front thereof in the common direction of movement of their upper segments, as best shown in Figure 5. Depending upon the average size of the fruit for which the machine is designed, the distance between the cones 130, 135 and the wheel 155 should be so chosen as to permit a fruit to seat itself upon said components with its center of gravity intermediately of its points of contact with the cones and its point of contact with the wheel, as illustrated in Figures 26a and b. When a fruit is seated in this manner, and the cones 130, 135 are in operation with the upper segments of both moving in the direction of the wheel 155, the ridges of said cones will engage the fruit and roll it in an opposite direction around an axis parallel to their own with its surface in contact with the edge of the wheel 155. To facilitate the described rotational movement of the fruit said wheel should be so arranged as to provide the required support for said fruit with minimum impediment to its rotatability. For this purpose, the wheel 155 (Figures 11 and 12) is rotatably supported upon a horizontal spindle 156 which is initially parallel to the rotational axis of the cones 130, 135 and, as said cones rotate said fruit in contact with said wheel in a direction opposite to their own, as previously described, said wheel is, in turn, rotated around its spindle 156 in the same direction as said cones, as indicated by the arrows in Figure 26B.

Thus, as long as the cones 130, 135 turn in the same direction, the wheel 155 will roll over the surface of the fruit substantially along a meridional circle thereof which may or may not contain the stem cavity of said fruit. As best shown in Figures 7 to 11, the edges of each of the wheels 155 are rounded off and the wheels are sufficiently small in diameter and narrow in axial width to fit into the stem indent of a peach or what other fruit the machine may be designed for. Therefore, if the stem indent of the fruit should happen to lie in the path of the wheel 155, said fruit will drop with its stem cavity partly surrounding said wheel causing the center of gravity of the fruit to move downwardly to a lower level and forwardly to a point more nearly in vertical alignment with the center of the wheel 155 than in its former position. This change in the position of the fruit relative to the drive cones 130, 135 and the finder wheel 155, with the upper segment of the latter protruding into the stem indent thereof, causes further operation of the drive cones to force an inclined surface of the stem indent radially against the edge of the finder wheel, so that the fruit is securely held in engagement with the finder wheel and is unable to continue its scanning revolutions.

However, if as is far more likely, the fruit meridional belt of the fruit surface scanned by the indent finder roller does not contain the stem cavity of the fruit, it is necessary that the fruit be shifted into a new position in which it will be turned around a different one of its diameters so that the finder wheel 155 may scan a different meridional belt of its surface. The natural unevenness in the shape of fruit, such as peaches, apricots, and the like, may, of course, be effective to reposition such fruit for rotation around different ones of its diameters, but considerable time may pass before such a change will occur. The above described temporary reversal in the direction of rotation of one of the fluted cones provides means, however, which positively shift the fruit after a predetermined scanning period into a new position in which the finder wheel 155 will scan another meridional belt of its surface.

Whenever the movement of the outer cone 135 is reversed in the manner previously described, the opposite rotational moments imparted to adjacent quadrants of the bottom hemisphere of the fruit turn said fruit around an axis that extends at right angles to its former axis of rotation and is angularly inclined to a horizontal plane in the direction of the finder wheel.

As a result thereof, the fruit is twisted out of its previous position relative to the scanning axis to an extent determined by the rapidity and duration of the reversal of the direction of rotation of cone 135, and, as soon as said cone resumes its forward movement, the fruit will be turned around another one of its diameters causing the finder wheel to scan another one of its circumferential belts. Thus, time wasting repetitive scanning of surface regions that do not contain the stem cavity, is effectively avoided and by appropriately proportioning the rapidity, duration, and frequency of the reversals of the direction of rotation of cone 135 the described mechanism may be adapted to systematically scan the total surface of a fruit along a predetermined number of meridional circles thereof.

To minimize interference of the finder wheel with the lateral shifts of the fruit, said wheel is arranged to assume automatically a position in which the twists imparted to the fruit by the reversal of the direction of rotation of the outer cone will roll it around its spindle 156. For this purpose, the horizontal spindle 156 is bent downwardly to form a stem 157 that is rigidly supported by the upper end of a vertical swivel shaft 159 which is disposed within upper and lower bearings 160 and 161, respectively, for horizontal revolving, as well as vertical sliding movement. These bearings may be supported from suitable mounting plates 163 which are bolted to the horizontal lip portion 118 of the turret 115, with said bearings protruding downwardly through corresponding apertures 164 provided in said lip portion, as shown in Figures 4 and 11 to 14.

At a point intermediately of the bearings 160 and 161 the shaft 159 carries a gear 165 (Figures 2, 4, 11, 12, 13, and 14) that meshes with a gear segment 166 (Figures 7 to 10) which forms one arm of a cam follower lever 167. This cam follower lever is pivoted on a bushing or sleeve 168 supported from the above mentioned mounting plate 163 and has a second arm 169 which is provided with a roller 170. A contraction spring 171 tensioned between the segment 166 and a suitable stud of the mounting plate 163 urges the roller 170 into contact with the contour of an internal cam 172 that is carried by the outer wall 105 of the channel or runway 102 formed in the peripheral region of the stationary disc 101 (Figures 4 and 6).

As best seen from Figure 6, the internal cam 172 has an initial portion a that is smoothly circular and extends over approximately 120 degrees of the circumference. This cam portion maintains the gear segments 166 and the cooperating gears 165 in the position illustrated in Figure 7 which aligns the vertical wheels 155 with the symmetrical planes of their associated cones 130, 135 and places them tangentially with respect to the circular course of the orienting units 125 around the center of the machine, as illustrated at *a* in Figures 1 and 5. Over the adjoining 180 degrees of its circumference, however, the cam 172 possesses a sequence of recesses or depressions 173 of relatively narrow width which are spaced equal angular intervals apart, as shown at *b* in Figure 6. Whenever the roller 170 of a cam follower lever 167 drops into such a depression, the spring 171 swings its segment 166 in counterclockwise direction, as shown in Figure 8, and, in consequence thereof, the gear 165 enmeshed therewith is turned in clockwise direction placing its wheel 155 at an acute angle relative to a plane disposed at right angles to the axis of rotation of the cones 130, 135, as illustrated at *b* in Figures 1 and 5. As the roller 170 climbs out of such a depression, however, the segment 166 and the gear 165 are quickly restored to their original positions in which the plane of their respective wheel 155 extends substantially tangentially with respect to its circular course of travel. Thus, as the fruit orienting units 125 are carried around the machine and pass through the sector *b* thereof, their wheels 155 oscillate intermittently from a tangential position with respect to their circular course (Figure 7) to a selected clockwise position (Figure 8) of an angular displacement determined by the depth of the recesses 173.

By appropriately spacing the recesses 173 along the cam sector 172*b* in relation to the intervals between consecutive peaks of the cam 139 which controls the movement of the reversible drive cones 135, the finder wheels 155 may, therefore, be arranged to momentarily swing into the position illustrated in Figures 8 and 13 whenever their associated cones 135 reverse their direction of rotation. In this position the plane of rotation of the wheel is such that the peripheral rotational movement of the rim of the wheel is more nearly in the direction in which the fruit surface at the point of contact with the finder wheel must move into a new scanning plane in the manner described above (Figure 27A), so that any frictional resistance presented by the wheel 155 to the steering shift of the fruit is effectively reduced by rotation of said wheel around its spindle 156 and will not appreciably affect the intended course of the steering twist imparted to the fruit.

In the preferred embodiment of the invention illustrated in the accompanying drawings, the stem 157 of the finder wheels 155 is slightly off-set in a direction opposite to its associated drive cones 130, 135 such that the center line of the swivel shaft 159 intersects the edge of the finder wheel at a point somewhat below the wheel crest on the side facing the drive cones, as best shown in Figures 11 and 12. This point is the presumptive point of contact between the wheel and a fruit seated upon the three-point support formed by said wheel and said drive cones and due to its position within the center line of the swivel shaft 159, said point will retain its place when the wheel 155 is swiveled around said shaft 159. Hence, when the finder wheel 155 is turned in clockwise direction (as viewed from the top) to accommodate the lateral twists imparted to the fruit by the reversal of the direction of rotation of the outer drive cone 135, this change in the position of said wheel will, in itself, impart relatively little movement to the fruit. Therefore, the extent of the described steering twists imparted to the fruit may be pre-established with a high degree of approximation by proper design of the ascending slopes 140*a* to the cone controlling cam 139.

Thus, as an orienting unit 125 travels along its circular course around the main shaft 106 of the machine, its finder wheel 155 will systematically scan the surface of a fruit seated on said unit along adjacent meridional circles and thus will sooner or later encounter the stem cavity of said fruit causing it to drop with said cavity onto the upper wheel segment which effectively prevents further driving and steering action of the fluted cones upon said fruit as previously described.

While the described orienting operation is effective to align the stem blossom axes of the fruit in a predetermined manner, the indent finder wheel 155 of the orienting unit will, in most instances, encounter the stem cavity at an angle relative to the suture plane of the fruit. Hence, although the axis of the fruit may now be properly oriented, its seam or suture plane may depart from the vertical plane of the finder wheel by as much as 90 degrees. To align the suture plane of the fruit with the vertical plane of the wheel 155, said wheel is, therefore, arranged to oscillate on its swivel shaft 159 in counterclockwise, as well as clockwise, direction (as viewed from the top) during the final phase of each complete fruit orienting cycle as provided by the machine of the present invention. For this purpose, the final 60 degrees of the annular cam 172 are of an undulating contour alternating between inwardly protruding rounded lobes 174, 174′, and 174″ and outwardly receding depressions 175, 175′, and 175″, respectively, of decreasing angular width and radial depth, as shown at *c* in Figure 6. As the roller 170 of a cam follower 167 ascends the lobe 174, the segment 166 of said cam follower is swung in clockwise direction, as indicated by the arrow 166*a* in Figure 9 and turns its cooperating gear 165 in counterclockwise direction causing the wheel 155 to swing in the same direction into the position shown in said Figure 9 which is angularly displaced in counterclockwise direction from the normal tangential position of said wheel 155 by an arc that may approach 90°. As the roller 170 descends from the top of the lobe 174 to the bottom of the succeeding depression 175 it causes the wheel 155 to reverse its course and swing through its tangential position of rest to the extreme clockwise position illustrated in Figure 10 from where it returns to a counterclockwise position of lesser angular displacement as the roller ascends the second one of the inwardly directed lobes 174′; and after the roller 170 has negotiated all the lobes and depressions that may be provided, the wheel 155 settles in the original position illustrated in Figure 7 wherein it is substantially aligned with the symmetrical plane of its associated cones 130 and 135, i.e., with a plane disposed at right angles to the axis of rotation of the cones. As the finder wheel 155 oscillates in this manner within and relative to the shallow portion of the stem cavity of the fruit, the sloping sides of the cavity will cooperate with the motion of the finder wheel to swing the suture plane of the fruit substantially into parallelism with the wheel plane in the neutral position assumed by the finder wheel at the end of the period of oscillation and when this occurs, the peach will drop deeper over the finder wheel seating itself firmly upon the upper segment thereof with its seam in alignment with the plane of said wheel. Thus, when the oscillations of the finder wheel come to a halt at the end of sector *c* of the annular cam 172, the peach seated thereon is properly oriented, its stem blossom axis being in vertical position with the stem cavity pointing in downward direction and the seam of the fruit extending in a tangential plane with respect to the rotary course of the orienting machine (Figures 31A, B, and C).

The blossom ends of peaches and other fruit of the type here under consideration frequently exhibit surface irregularities, such as dimples and/or peaks, which may engage the finder wheel 155 during the scanning phase of the described orienting process and frustrate the action of the drive cones 130, 135 in somewhat the same manner as if the finder wheel had been engaged by the stem cavity of the fruit. To avoid such action in the operation of the described fruit orienting mechanism, the present invention comprises means effective to dislodge the finder wheel from irregularities of this type, yet ineffective to dislodge said wheel from engagement within a proper stem cavity should such an engagement have been accomplished during the initial stages of the orienting process.

For this purpose, the lower end of each of the vertically slidable shafts 159 is provided with a roller 179 which is adapted to engage a camming ridge 180 arranged at the bottom 103 of the channel 102 (Figures 2 and 4). A compression spring 181 (Figures 11, 12, and 13) around the shaft 159 and disposed between the bottom face of the upper bearing 160 and a collar pinned to said shaft 159 directly above the gear 165 urges said shaft in downward direction to maintain said roller 179 in contact with the contour of the camming ridge 180.

The camming ridge 180 (Figure 6) commences with a short ascending slope 183 at a point some distance behind the beginning of sector $a$ of the internal cam 172 in the direction of movement of the turret 115 and extends over an arc of about 300 degrees around the center shaft of the machine, terminating with a short downwardly inclined slope 184 at a point in radial alignment with the end of sector $b$ of said internal cam. The initial sector of the bridge 180 runs at an even height to a point in said radial alignment with the first of the recesses 173 in sector $b$ of the internal cam 172, as shown in Figure 6, and said height is so dimensioned that when the rollers 179 ride on said ridge, the finder wheels are maintained at an altitude in which their rotational axes are of the same level as the rotational axes of the drive cones, with their presumptive fruit contact points sufficiently high to maintain a fruit placed upon the unit 125, in engagement with the upper forward quadrants of said cones, as illustrated in Figures 11, 13, and 26. In radial alignment with the first of the recesses 173, however, the camming ridge 180 rises above its previous level in the form of a hump 185 of limited length which is adapted to briefly raise the finder wheel to a somewhat higher level, as illustrated in Figure 12. Additional humps of the same or similar construction may be provided at later points of the camming ridge 180 and may be radially aligned with selected ones of the recesses 173 in the internal cam 172 but are preferably omitted from the final stretches of the camming ridge 180, as shown in Figure 6.

Thus, as a roller 179 ascends the initial slope 183 of the camming ridge 180, it raises its finder wheel 155 to the position shown in Figure 11 in which it is maintained until said roller 179 encounters a hump 185. Whenever this occurs, the wheel 155 is briefly jolted above its normal level, as illustrated in Figure 12, so that an upward jolt is imparted to the fruit which has been found effective to disengage the finder wheel from any irregularities in the surface of the fruit other than the actual stem indent.

Having reference to Figure 6, it should be noted that the jolting humps 185 on top of the camming ridge 180 are all shown in angular alignment with recesses 173 in the camming surface of the annular cam 172. As previously explained, these recesses 173 effect the intermittent clockwise turns in the position of the finder wheels 155 which accompany the reversals of the outer drive cones 135 that steer the fruit into new scanning planes. As will be seen from Figures 7 to 10 in combination with Figures 11 to 14, however, the actuating mechanisms of the described orienting units are so arranged that the roller 170 which drops into the recesses 173 trails behind the roller 179 at the bottom of the swivel shaft 159 which supports the finder wheel 155. As a result thereof, the dislodging jolts imparted by the humps 185 will occur before, and be completed by, the time the finder wheel swings into its clockwise position and the outer drive cone 135 reverses its course to shift the fruit into a new steering plane. The purpose of the described sequence in the occurrence of dislodging jolt and steering operation is to release any obstruction in the moveability of the fruit before the orienting mechanism acts to steer said fruit into a new scanning plane, in order that said steering operation may be fully effective and may cause the immediately subsequent scanning operation to occur in a new plane. If the described dislodging jolt were applied after a steering operation and said steering operation had remained ineffective, the drive cones might roll the released fruit substantially along the previously scanned meridional circle thereof which would not only be useless, but might result in entanglement of the finder wheel with the same surface irregularity of the fruit that caused the original obstruction.

When the roller 179 finally descends the downwardly inclined slope 184 at the end of the camming ridge 180, the gravity of the assembly and the spring 181 cause shaft 159 to slide downwards within its bearings 160 and 161 as far as eventual contact of the gear 165 with the lower bearing 161 will permit. The resultant drop in the level of finder wheel 155 causes a fruit positioned with its stem cavity upon the upper segment of said wheel to tilt forwardly out of contact with the drive cones 130, 135, and with the roller 179 hanging freely in the air above the bottom of the runway 102 (Figure 14), the swivel shaft may now be oscillated freely in both directions by the undulant sector $c$ of the annular cam 172, as previously explained, in order that the wheel 155 may find the deepest spot in the stem indent of the fruit (Figures 30A, B, and C).

Each orienting unit 125 is provided with guard means to prevent fruit from dropping off as it is being delivered onto said units from the hopper A or as it is being agitated by movement of the described components 130, 135, 155. For this purpose, a confining surface 186 is arranged between the drive cones of each orienting unit (Figures 1 and 5) and ascends obliquely from a point near the rotational axis of said cones in rearward direction. Said surface may be formed by a strip of metal and may form part of a trapezoidal frame 187, the bottom leg of which is bolted to the horizontal surface 118 of the two-stepped lip 116 formed in the peripheral region of the turret 115, as shown in Figure 11.

Forwardly of the drive cones, a guard railing 188 is arranged around each of the finder wheels 155 which is composed of two parallel rails of semi-circular shape. These rails are held in a vertically spaced relation by a number of suitable balusters 191 (Figures 11 to 14) and extend from close to the base of the outer cone 135 to close to the base of the inner cone 130, as best shown in Figure 5.

Since fruit delivered improperly from the hopper A onto the orienting units 125 may position itself between the finder wheel 155 and the guard railing 188 and thus be out of the reach of the drive cones 130, 135, the guard railing 188 may be arranged to oscillate continuously in horizontal orbits of sufficient radius to shift such mispositioned fruit into the proper orienting position wherein it is seated between the drive cones 130, 135, and the finder wheel 155.

For this purpose, radially extending arms 192 (Figures 1 and 2) support the guard railing 188 from a common ring or collar 193 that is disposed around the inner vertical lip 117 of the turret 115. The ring 193, in turn, is supported by three brackets 194 spaced equal angular intervals apart, and said brackets are rigidly attached to the outer races of three floating ball bearings 196 located in suitable niches 197 provided in the inner vertical lip 117 of said rotor 115, as shown in Figure 15. Disposed within the inner race of each of said floating bearings 196 is a stub shaft 199 which is eccentrically mounted upon a disc 200 supported upon the upper end of a vertical shaft 201. This shaft is suitably journalled within the inner lip 117 of said turret and extends downwardly through said lip into the space between said turret and the stationary bottom disc 101 (Figure 2). Pinned to the lower end of said shaft 201 is a sprocket wheel 202 which meshes with a sprocket track 203 provided around the inner wall 104 of the channel 102 formed in said stationary bottom disc 101.

Whenever the machine operates and the turret 115 revolves, the three sprocket wheels 202 are rolled around the track 203 turning the shafts 201 with the discs 200.

In consequence thereof, the eccentric stubs 199 revolve around the centers of their respective discs in circles of a size determined by their eccentricity. All three of said discs 200 and their eccentric stubs 199 are so adjusted relative to one another that they rotate in perfect alignment, that is to say, the diameters of said discs intersecting their respective stubs are initially adjusted to parallel alignment and remain permanently in this relation as said discs revolve during operation of the machine. As a result of this aligned movement of said eccentric stubs, the ring 193 supported from the outer races of the floating bearings 196 is subjected to an oscillatory milling motion which is transmitted to the guard railings 188. Therefore, as the turret 115 revolves and the many orienting units 125 are carried around the main shaft of the machine, the guard railings continuously change their position relative to their respective units shifting from outwardly displaced positions through properly centered positions to inwardly displaced positions and vice versa, while at the same time moving closer to or farther away from said units, as is shown in Figure 1, wherein consecutive units 125 illustrate successive stages in the relation between the guard railings 188 and the components 130, 135, and 155.

Lest fruit delivered onto the orientation units 125 be bruised by the edges of the finder wheels 155 or the ridges of the drive cones 130, 135 as it drops from the hopper A, a circular ring 205 is arranged around each of said wheels 155, as shown in Figures 1 and 5. This ring is adapted to be raised automatically above the crest of its associated wheel 155 at the station where the fruit is supplied to the machine, but is maintained at about the level of the wheel center during the actual orienting operations to expose a sufficiently large segment of the wheel 155 for the stem indent of a peach or like fruit to seat itself securely thereon.

To perform in this manner, each of said rings 205 (Figure 11) has a vertically depending arm 206 which is pivoted at 207 near its upper end to one of the shanks of a frame 208 (Figure 10) of horse shoe shape that is rigidly mounted in a forwardly declined position upon a vertical shaft 210 (Figures 13 and 14). This shaft is firmly seated in the upper end of a tubular extension 211 (Figure 16) that is slidably disposed within a bushing 212 rigidly supported from the previously described mounting plate 163. Over part of the travel of each orienting unit 125 around the main shaft of the machine, the vertical position of the shaft 210 and, hence, of the ring 205, is controlled by a camming ridge 215 (Figure 6) which is provided along the bottom 103 of the runway 102 formed in the stationary bottom disc 101 and is adapted to engage a roller 216 pivoted to the lower protruding end of the tubular shaft extension 211. Said roller 216 is maintained in contact with said camming ridge 215 by means of a compression spring 217 (Figure 16) which is encased in the hollow interior of said tubular extension 211 and is held between the closed bottom thereof and a transverse pin 218 anchored in the wall of said bushing 212 and protruding through diametrically opposite slots 219 in said tubular extension 211. Since the transverse pin 218 is immovable, the force of the spring 217 is exerted against the bottom of the tubular extension 211 urging it to slide downwardly relative to its bushing 212. However, whenever the camming ridge 215 engages the roller 126, said shaft extension 211 is held in the elevated position illustrated in Figure 11 in which the horse shoe frame 208 maintains the ring 205 above the highest point of the oscillating wheel 155, as illustrated in Figures 11 and 25B and C. To keep the protective ring 205 in the perfectly horizontal position illustrated in said Figure 11, the lower end of its depending arm 206 is bent slightly in backward direction, as shown at 220, and a camming stud 221 suitably supported from the mounting plate 163 is provided at the correct altitude to be engaged by said backwardly curved lower end 220 of arm 206 whenever the camming ridge 215 raises the ring 205 to the extreme elevated position illustrated in Figure 11.

The most important function of the ring 205, however, is to lift the oriented fruit from the finder wheel 155 after completion of the orienting operations and present it in properly oriented condition to the grasping arms of the transfer mechanism C. For this purpose, the camming ridge 215 (Figure 6), which lifts the ring above the crest of the finder wheel 155 in the manner described above, commences with a gently rising slope 222 at a point in angular alignment with the end of the undulant sector c of cam 172 which marks the end of the orienting operations. Thus, after an orienting unit has been subjected to all the actuation provided by the annular cam 172 and the camming ridge 180, its roller 216 at the bottom of the composite shaft structure 210, 211 encounters the gradually ascending slope 222 of the camming ridge 215 causing the ring 205 to be gently raised to the elevated horizontal position illustrated in Figures 11 and 31B and C in which the oriented fruit seated thereon may readily be grasped by the arms of the transfer mechanism C without interference from the finder wheel 155, the drive cones 130, 135, or the guard railing 188.

After the arms of the transfer mechanism C have removed the oriented fruit from the unit 125, the ring 205 is preferably maintained in the elevated position illustrated in Figure 11 until said unit has passed the hopper station and has received a new fruit from the supply hopper A. Thus, while the machine of our invention may comprise two separate camming ridges 215, one for elevating the rings 205 at the point where the orienting units are supplied with fruit from the hopper A (Figures 25A, B, and C) and another one at the point where the oriented fruit is taken over by the transfer mechanism C (Figures 31A, B, and C), it is more convenient to provide a continuous camming ridge extending from the above defined point in angular alignment with the end of the undulant cam sector 172c in counterclockwise direction to a point beyond the hopper station of the machine but prior to the first of the recesses 173 of the cam sector 172a. At this latter point the camming ridge 215 may terminate with a steep downwardly inclined slope 223, as shown in Figure 6. As the roller 216 descends said steep slope 223, the spring 217 within the tubular shaft extension 211 expands and forces said extension downwardly within the bushing 212 to an extent determined by the vertical depth of the slots 219 that are slidingly engaged by the transverse pin 218. The depth of these slots is so dimensioned that the ring 205 drops to the center level of the finder wheel 155 so that at least half of the circumference of said wheel rises above said ring (Figures 27A, B, and C) and is now free to enter the stem indent of whatever peach or other fruit may have been placed upon the ring 205 at the hopper station A. In order that the ring 205 may assume a horizontal position when lowered in the described manner, its forward segment is provided with another downwardly projecting stud 224 which rests upon a horizontal platform 158 that is ridgidly supported from the shaft 159 of the finder wheel 155.

Whenever an orienting unit 125 reaches the counterclockwise end of the rocking ridge 180 and its roller 179 descends the slope 184 thereof, the shaft 159 and the platform 158 drop to the position illustrated in Figure 14. As a result thereof, the forward sector of the ring 205 loses its normal support and is pulled downwards by a spring 225 disposed between said forward sector and an appropriate point of the horse shoe frame so that said ring assumes a forwardly declined position substantially parallel to said horse shoe frame, as illustrated in Figure 14 and in Figures 30B and C. This change in the position of the ring 205, at the time the roller 179 drops from the camming ridge 180 and lowers the finder wheel 155, as previously described, aids in disengaging the fruit from the drive cones 130, 135 and tends to maintain said fruit out of contact with said cones while the lowered wheel 155 is oscillated to find the suture plane of the stem cavity of the fruit; and by the time the oscillations of the finder wheel 155 have come to an end and said wheel has assumed its normal position substantially within the symmetrical plane of its associated drive cones, i. e., within a plane normal to the axes of rotation of said cones, the roller 216 encounters the gently rising slope 222 at the clockwise end of the camming ridge 215 and lifts the ring 205 above the wheel 155 to present the oriented fruit to the grasping arms of the transfer mechanism C, as explained hereinbefore and as illustrated in Figures 31A, B, and C.

As previously stated, the described orienting machine is supplied from a hopper A which is adapted to deliver the fruit individually onto the circulating orienting units 125 of the machine. Such a hopper may be of the type disclosed in the copending application of Albert R. Thompson for Apparatus for Feeding and Orienting Pears, Serial No. 571,146, filed January 3, 1945. Briefly, it comprises an obliquely positioned stationary valve plate 231 (Figures 1 and 4) which has an aperture 232 near its upper edge at a point above the circular path of the orienting units 125. Disposed concentrically above the valve plate 231 is a rotating drum 233, the bottom plate of which is provided with a plurality of equi-spaced tubular pockets 234 arranged at equal angular intervals along the circumference of said drum. Said pockets have open bottoms and both said pockets and the aforementioned aperture 232 are of a diametrical size that will admit only a single fruit at a time. Thus, when peaches are delivered in bulk into the drum 233 the lower portion thereof and said drum is set into motion, they will drop individually into said pockets 234 and be carried to the upper portion of the inclined drum; and, as soon as a loaded pocket registers with the valve aperture 232, the peace contained in said pocket drops through said aperture onto a tangentially positioned slide 235 (Figure 4) which guides it to a point directly above the path of the orienting unit 125 from where it will fall onto whatever unit may happen to pass underneath.

It will be understood that the rotational speed of the drum must be carefully synchronized with the speed of the turret 115 in order that the peaches dropping individually from the hopper 230 may be accurately delivered into successive ones of the circulating orienting units 125. In the particular embodiment illustrated in the drawing the rotating drum 233 (Figure 4) is bolted at its center to a short shaft 238 which is journaled in a bearing 239 rigidly supported in the center of the stationary valve plate 231. The protruding lower end of the shaft 238 carries a bevel gear 240 which meshes with another bevel gear 241 fixed on a horizontal shaft 242 which is operatively connected through a sprocket chain 243 with a power shaft 244 (Figures 1 and 4).

To prevent overloading of the hopper drum 233, the flow of fruit into said drum may be automatically controlled by a gate (not shown) that is caused to close as soon as the weight of the hopper exceeds a predetermined limit, and which is arranged to reopen as soon as the weight of the hopper drops below said limit, as likewise disclosed in the aforementioned patent application Serial No. 571,146.

The transfer mechanism C (Figures 1, 2, and 17) of the machine of the present invention is located at a point above the initial portion of the camming ridge 215 which lifts the rings 205 of the orienting units above the finder wheels 155 thereof. Said transfer mechanism comprises a vertically positioned rotatable carrier plate or transfer turret 250 which holds five bearings 251 arranged along its circumference at equal angular intervals, as shown in Figure 17. Journalled in, and projecting beyond said bearings at either side of the carrier plate 250, are short horizontal shafts 252 and firmly clamped to the outwardly projecting end of each of said shafts is a fruit grasping transfer unit 255 which possesses a pair of downwardly extending arms 256 and 257, respectively, as best shown in Figure 2.

The transfer turret 250 is rotatably mounted upon a short stationary shaft 258 which is rigidly held in horizontal position a predetermined distance above another horizontal shaft 259 by means of a suitable clamp 260. The last mentioned shaft 259 protrudes radially into the interior of the cupola 107 and is securely held in a stationary horizontal position by brace 261 depending from and bolted to the ceiling of the cupola 107. Rotatably mounted upon the shaft 259 (Figure 2) within the cupola 107 is a gear 262 which meshes with the previously described horizontal gear wheel 114 that is driven from the main drive shaft 110 to operate the main turret 115. The gear 262 possesses a lateral sleeve 263 that protrudes through the wall of the cupola 107, and keyed upon the outwardly projecting end of said sleeve is a spider 265 that has as many spokes 266 as there are bearings 251 supported by the transfer turret 250. At points radially spaced from the center of the spider 265 by a distance equal to the radial distance between the center of the transfer turret 250 and its shafts 252, each of said spokes carries an outwardly directed horizontal stud 267 which is pivotally anchored in the lower end of a downwardly directed arm or link 268 that is firmly mounted upon the rearwardly projecting end of a respective one of the transfer turret shafts 252. Thus, when the gear wheel 114 is in rotation and the main turret 115 carries the orienting units in counterclockwise direction around the stationary center shaft of the machine, as viewed from the top, said gear wheel 114 turns the gear 262 and, hence, the spider 265 in counterclockwise direction, as viewed from the periphery of the machine. As the spider 265 revolves in this manner, the links 268 pull the transfer turret 250 in the same direction remaining at all times parallel to the plane determined by the rotational axes of the transfer turret and said spider; and due to the fact that said connecting links 268 are firmly mounted upon the shafts 252 journaled in the transfer turret bearings 251 but are freely rotatable on the studs 267 held by the spider spokes 266, the transfer units 255 are all maintained in an identical position which is so adjusted that their arms 256, 257 extend in downward direction as the revolving spider 265 swings the transfer turret 250 around its stationary shaft 258.

As apparent from Figures 1 and 2, the transfer turret 250 is arranged to turn in a vertical tangential plane with respect to the orienting or main turret 115 at such a radical distance from the center of the machine that the transfer units 255 operate directly above the path of the orienting units 125 with the arms 256 and 257 straddling said path at the pickup point. The arms 256 and 257 terminate into inwardly directed fruit grasping surfaces or jaws 271 and 272, respectively (Figures 2 and 17), and each transfer unit comprises means maintaining said arms sufficiently spread apart for said jaws to pass freely on either side of a peach of maximum size, combined with means automatically effective, at or near the lower point in the path of each transfer unit, to yieldably urge said arms into a closed position in which their jaws firmly grip an intermediately positioned oriented fruit at either side of its suture plane.

For this purpose, the arms 256 and 257 (Figures 21 and 22) are firmly mounted upon the protruding ends of two parallel shafts 274 and 273, respectively, which are journalled in and extend through the side walls 275 and 276 of said transfer units. In the particular embodiment of the invention illustrated in the accompanying drawings, said arms 256 and 257 are arranged to traverse one another in scissor fashion, as best shown in Figures 19 and 20, so that the arm 256 of the inner jaw 271 is mounted upon the outer shaft 274 while the arm 257 of the outer jaw 272 is mounted upon the inner shaft 273.

We prefer such an arrangement because the increase in the length of the arms, thus obtained, reduces the operating angle over which the shafts must turn to move their jaws from open to gripping position. Also, with the arms crossing one another in this manner, their jaws will descend to progressively lower levels as the arms approach one another, and thus will come into contact with fruit of smaller size at lower levels than with the larger specimens, so that the mechanism may be designed to grip all fruit at its equatorial belt, halfways of its natural height, whether a particular specimen is large or small. Additionally, the arms 256 and 257 are preferably bent backwardly, as shown in Figure 17, to place the jaws 271, 272 directly below the center of the transfer units from which they are supported. As a result of this arrangement, the individual transfer units may be grouped along a circle of relatively small diameter without interference between the gripping arms and the body portions of consecutive units as they are circulated around the center shaft of the transfer turret with their arms maintained in a downwardly extending position.

Firmly mounted upon each of said shafts intermediately of the walls 275, 276 are two enmeshed tooth segments 277 and 278, respectively, and a spring 279 tensioned between an eye 280 on the outer segment 278 and an eye 281 in the wall 276 below the inner segment 277 (Figure 21) urges said outer segment in clockwise direction which, in turn, urges said inner segment in counterclockwise direction, as viewed in Figure 19, to spread the jaws 271, 272 sufficiently apart to freely pass the maximum sized specimens of the fruit for which the machine may be designed. To close the jaws 271 and 272 and thus grip an intermediately positioned fruit, each transfer unit comprises automatically effective means to swing the outer tooth segment 278 in counterclockwise direction against the urgency of the spring 279. For this purpose, the outer segment is provided with a lateral stud 285 (Figures 19, 20, and 21) which is engaged by the forked end 286 of a plug 287 that is rigidly attached to and forms one of the end walls of a cylindracil container 288. The opposite end wall of the container 288 is formed by a collar 289 within which is slidably disposed another plug 290 having an outwardly protruding head which is forked and forms two prongs 291. Said prongs are journalled on a short shaft 292 that is held in a horizontal position by the shanks of a yoke shaped bracket 293 which is rotatably supported from the shaft 273 of the inner tooth segment 277. Interiorly of the container 288 the plug 290 forms a tenon 294 which slidably engages the hollow interior of an inwardly directed tubular projection 295 of the opposite plug 287, as shown in Figures 19 and 20. Coiled around said tenon 294 and projection 295 is a heavy expansion spring 296 which bears against the plug 287 and a collar 297 that is arranged around the tenon 294 and which has a flange 298 of a larger diameter than the aperture of the previously mentioned collar 289 within which the plug 290 is slidably disposed. This expansion spring 296 is sufficiently stronger than the contraction spring 279 which urges the arms 256 and 257 into open position, to ordinarily permit the described spring box assembly 290, 296, 287 to act like a rigid pitman whenever force is applied against its plug 290 to shift the outer tooth segment 278 in counterclockwise direction against the urgency of said contraction spring 279.

Intermediately of the prongs 291 of the slidable plug 290 the shaft 292 carries a roller 300, as shown in Figures 21 and 22, and with the two tooth segments 277, 278 in the position illustrated in Figure 19, in which the grasping arms 256, 257 are idly spread apart, said roller 300 is seated in the upper one of a pair of sequentially adjacent concave recesses 301 and 302 provided in the free forward edge of a lever arm 303 which is firmly mounted upon a horizontally positioned operating shaft 304 that is journalled in the side walls 275, 276 of the transfer unit. Said free end of the lever arm 303 slants somewhat to the right, as viewed in Figures 19 and 20, so that the lower concave recess 302 is positioned somewhat farther away from the axis of the operating shaft 304 than the upper recess 301.

When the shaft 304 is operated to swing the lever arm 303 in counterclockwise direction and the roller 300 is forced across the dividing peak 307 into the lower recess 302, the swinging bracket 293 is pushed somewhat to the right, as viewed in Figures 19 and 20, and transmits its shift through the connecting link formed by the plug 290, the spring 296 and the plug 287 to the outer tooth segment 278 which is forced to yield in counterclockwise direction due to the greater strength of the spring 296 as compared with the spring 279. As the outer tooth segment 278 swings in counterclockwise direction, it causes the inner tooth segment 277 to swing over a corresponding angle in clockwise direction and, as a result thereof, the arms 256 and 257 and their jaws 271 and 272, respectively, approach one another and assume the position shown in dotted lines in Figure 20 wherein they will remain—unless a positive exterior force restores the lever arm 303 to its initial position—since the roller 300 is unable to negotiate the dividing peak 307 against the pressure exerted by the contraction spring 279, which maintains said roller 300 within the deepest portion of the lower recess 302. To avoid any play or looseness between the roller 303 and the upper recess 301 whenever the mechanism is in open position, a small compression spring 308 may be arranged within the tubular projection 295 of the container plug 287 to bear against the tenon 294 of the slidable container plug 290.

The described mechanism should be so dimensioned that with the roller 300 seated in the lower recess 302, the distance between the jaws 271 and 272 is slightly smaller than the equatorial diameter of the smallest sized specimen of the fruit for which the machine is designed. Thus, when a fruit is positioned between the jaws and actuation of the operating shaft 304 shifts the lower recess 302 into engagement with the roller 300, said jaws will encounter said fruit and be restrained from reaching their closest position, whether said fruit be large or small (Figure 20). As a result thereof, the segment 278 resists the force developed by the positive lateral shift of the roller 300 as soon as the claws 271, 272 contact the fruit, and under the force and counterforce set up in this manner at opposite ends of the power transmitting link 290—296—287, the spring 296 of said link is compressed and permits the plug 290 to slide deeper into the container 288, thus shortening the length of said link to an extent determined by the diameter of the fruit. By properly proportioning the strength of the spring 296 relative to the spring 279 and relative to the surface resistivity and the weight of the fruit to be transferred, the described arrangement may be adapted to dependably grip the smallest specimen of said fruit without crushing or otherwise injuring the largest specimen thereof.

The machine of the present invention comprises means automatically effective to close and open the jaws of the transfer units 255 at predetermined points of their circular course around the shaft of the transfer turret 250 and for this purpose the operating shafts 304 of the transfer units are arranged to project beyond the walls 275 and 276, as shown in Figure 23. Firmly mounted upon one of the projecting ends of each shaft 304 is an actuating arm 310, the free end of which is provided with a horizontal cross beam 311 in the manner of a T. The upwardly directed face of said cross beam is formed into a camming surface 312 having a forwardly positioned ascending slope 312a which culminates in a rounded peak 312b, and supported from the stationary cupola 107 of the machine at a point near the lowest level of the circular course followed by the transfer units is a camming roller 314 (Figure 2) which is arranged to engage the ascending slope 312a of the camming surface 312, as a unit 255 approaches its lowermost point, and pushes the actuating arm 310 in downward direction as it strikes against the peak 312b. The resultant rotation of the shaft 304 rocks the camming lever 303 from the position shown in Figure 19 in which its upper recess 301 engages the roller 300 into the position shown in Figure 20 in which its lower recess 302 engages said roller, and thus effects closing of the jaws 271 and 272 in the manner previously described to resiliently grip whatever fruit may lie upon the elevated ring 205 of an orienting unit passing underneath. As the transfer unit moves on, it lifts the fruit held between its claws from the orienting unit and transfers it in oriented condition to the conveyor D of a fruit preparation machine, or the like. In the exemplary embodiment illustrated in the accompanying drawings (Figures 17 and 18) said conveyor is formed by an endless belt 320 which carries a sequence of knives 321 each composed of a forwardly positioned arcuate blade 322—that is preferably serrated—and a rearwardly positioned lobe 323. The transfer units 255 and the slicing knives 321 are arranged to move in oppositely ascending partially overlapping arcs with the knives 321 passing between the claws 271, 272, and the transfer mechanism C and the conveyor D are synchronized in such a manner that a fruit picked up by said claws is carried against the blade 322 of an ascending knife for said blade to penetrate into said fruit along its suture plane until the lobe 323 seats itself into the stem indent thereof. At this moment the jaws 271, 272 are arranged automatically to open up and release said fruit which is carried away along the path of the endless conveyor belt 320 to its next processing station (not shown).

For automatic release of a fruit held by the jaws 271, 272 the operating shaft 304 carries another actuating arm 325 mounted upon its other projecting end, as shown in Figure 23. Said arm possesses an obliquely ascending camming edge 326, as best shown in Figures 19, 20, and 24, which is arranged to strike against another camming roller 327 supported from the cupola 107 (Figure 17) whenever a transfer unit has risen to the point where the fruit should be released, as illustrated in Figure 18. When said edge 326 strikes against said camming roller 327, the operating shaft 304 is rocked in clockwise direction, as viewed in Figure 20, forcing the peak 307 of the lever arm 303 past and below the roller 300 which is thus returned to its initial position within the upper recess 301, as illustrated in Figure 19. Hence, the counterclockwise pressure exerted upon the outer tooth segment 278 through the yieldable link 290—296—287 is withdrawn permitting the segments 277 and 278 to follow the urgency of the contraction spring 279 which opens the jaws 271, 272 to release whatever fruit they may have held.

Although the operation of the various component mechanisms of the fruit orienting machine has been explained concurrently with the description of the mechanical construction of the machine, the basic occurrences produced, or initiated, by the described mechanisms will briefly be recapitulated since it is primarily the sequential and/or composite effect of these occurrences upon the processed fruit which forms the gist and essence of the present invention, while the construction of the mechanisms may be modified without departing from the scope and spirit of the invention.

A fruit delivered through the valve aperture 232 of the hopper A onto the slide 235 (Figure 4) drops upon the ring 205 of an orienting unit 125 passing underneath. At this point in the circular course of the orienting unit during the rotation of the main turret 115 around the center of the machine, the roller 216 engages the camming ridge 215 (Figure 11) placing the ring 205 into an elevated position above the crest of the finder wheel 155 (Figures 25A, B, and C). As soon as the roller 216 of an orienting unit, thus loaded, descends the counterclockwise slope 223 of the camming ridge 215 (Figure 6), the ring 205 drops to the level of the finder wheel center causing the fruit to position itself upon and between the drive cones 130, 135 and the finder wheel 155 with its center of gravity intermediately thereof (Figures 26A and B). At this point, as during the greater part of the circular course of the orienting units, the roller 179 (Figures 11 to 13) rides upon the camming ridge 180 (Figure 6), placing the center of the finder wheel 155 at about the level of the rotational axis of the drive cones 130, 135 with the fruit contacting a point slightly below the crest of said wheel on the side facing said drive cones, as shown in Figures 26A and B. In this position the ridges of the drive cones 130, 135 engage the surface of the fruit, and with both said cones turning in clockwise direction, as viewed in Figure 26B, said fruit is revolved in counterclockwise direction around a diameter parallel to the rotational axis of the drive cones, as indicated by the arrows in Figures 26A, B, and C, with the finder wheel 155 rolling upon its surface substantially along a meridional circle thereof and offering practically no resistance to the movement imparted to said fruit by the drive cones 130, 135.

However, it might have happened that the fruit did not seat itself properly between the drive cones 130, 135 and the finder wheel 155, but tilted forwardly or sideways and lodged itself between the finder wheel and the guard railing 188 beyond the reach of the drive cones 130, 135. In such an event the previously described oscillatory motion of the guard railing 188 along a horizontal orbit will quickly shift the fruit beyond the crest of the finder wheel into its proper orienting position, between said finder wheel and said drive cones.

As long as the drive cones 130, 135 revolve both in clockwise direction, the fruit is turned in counterclockwise direction with the finder wheel scanning a meridional circle of its surface. Since it is useless, however, to scan such a circle more than once, the outer drive cone will reverse its direction of movement after a predetermined period of time established by the design of the annular cam 139 which controls the movement of said outer drive cone in a manner previously described. The opposite rotational moments thus imparted to the fruit at adjacent quadrants of its lower hemisphere twist said fruit into a new position in which the previously scanned circle is angularly displaced from the rotatinonal plane determined by the common clockwise movement of both said drive cones, so that the finder wheel 155 may scan another meridional circle of the fruit as soon as the outer drive cone resumes its clockwise direction of movement. The size of the angular interval between adjacent scanning circles may be approximately preestablished by properly dimensioning the speed and the time of the reversal in the operation of the outer drive cone; and to reduce the number of imponderables that may variably affect the degree of displacement of the fruit, the recesses 173 in the sector b of the annular cam 172 are arranged to swing the finder wheel 155 into a clockwise position (Figures 27A, B, and C), whenever the outer drive cone reverses its movement, so that said wheel may be able to roll around its spindle 156 in response to the steering twist imparted to the fruit, thus minimizing any resistance that may affect the extent and direction of said twist. Hence, by properly dimensioning the angular intervals between adjacent meridional circles scanned by the finder wheel, the described arrangement may be adapted to scan the total surface of a fruit systematically so that the finder wheel is bound to encounter the stem indent of the fruit at some time during operation of the arrangement.

If, during the scanning motion of the fruit, the edge of the finder wheel 155 should engage a surface irregularly other than the stem cavity, such as the peaks or dimples frequently found at or near the blossom end of apricots, peaches, and like fruit, and further motion of said fruit should thus be arrested, the upward jolts imparted to the finder wheel (Figures 28A, B, and C), whenever the roller 179 negotiates one of the humps 195 on the camming ridge 180, will dislodge the fruit from the edge of said wheel and permit the scanning operation to continue. Eventually the finder wheel 155 is bound to encounter the stem cavity of the fruit whereupon said fruit will drop with said cavity over the upper segment of said wheel and reposition itself in such a manner relative to the finder wheel and the drive cones that said drive cones will actually hold the fruit with its stem cavity against the upper segment of the finder wheel, as illustrated in Figures 29A, B, and C.

Since the finder wheel will most likely not have encountered the stem cavity along the suture plane of the fruit, said wheel is alternately turned in opposite directions on a vertical axis during the final phase of the orienting operations so that its upper segment may register with, and sink into, the deepest furrow of the stem cavity which follows the suture plane of the fruit. During this last stage of the orienting operations, the finder wheel is dropped to a somewhat lower level with the ring 205 tilting toward the railing 188 which causes the fruit to disengage itself effectively from the drive cones and lean against said railing 188, as shown in Figures 30A, B, and C, so as to eliminate any interference from the drive cones during this final searching operation of the finder wheel. As soon as the edge of the finder wheel registers with the deep furrow which traverses the stem cavity in the direction of the suture line, the edge of said wheel sinks into said furrow and the fruit seats itself firmly upon said wheel, and, in consequence thereof, the suture plane of the fruit will be placed in a tangential position with respect to the circular course of the orienting units as soon as the oscillations of the finder wheel come to a halt at the end of sector c of the annular cam 172 (Figure 6). At this point, the roller 216 climbs upon the camming ridge 215 and elevates the ring 205 above the crest of the finder wheel and said ring, in turn, lifts the oriented fruit from the upper edge of said finder wheel and presents it in oriented condition (Figures 31A, B, and C) to the jaws of a grasping unit 255 for transfer to the conveyor D.

While the above described method of orienting indented fruit and the exemplary embodiment for performing the same comprises steps and mechanisms adapted to effect the scanning, steering, rocking, and suture finding operations required in accordance with the present invention in a particularly simple and effective manner, it will be understood that the present invention is not limited to the specific steps and constructions shown or described, since steps and mechanisms other than those specifically disclosed herein may be employed to perform in the same manner and with the same results. For instance, many mechanisms other than the particular camming arrangement shown may be adapted to appropriately control the operation of the reversible drive elements 135. Also, the drive elements 130, 135 need not necessarily have the form of fluted cones, but may be shaped in the manner of cylinders or even spheres. Thus, Figures 32 and 33 illustrate a modified orienting unit of somewhat simplified construction which is collectively identified by the reference numeral 125'. The components of said orienting unit 125' bear the same reference numerals as the corresponding components of the previously described orienting units 125, but modified constructions are identified by a prime ('). The orienting unit 125' agrees in most respects with the orienting units 125, except that its guard railing 188' is formed by a single sickle-shaped plate which presents its concave edge to the finder wheel 155; further, while the guard railing 188 of the originally described orienting units is arranged to oscillate in horizontal orbits, the guard railing 188' of the modified orienting unit is stationary relative to the finder wheel in that it is bolted directly to the inner vertical lip 117 of the turret 115, as shown in Figure 33; moreover, the inner edge of the sickle-shaped plate 188' is disposed sufficiently far from the finder wheel 155 to support fruit that tips forwardly over the finder wheel in a position to which it is permanently removed from contact with the drive cones 130, 135. The described arrangement is of special advantage in the case of large specimens of fruit which rest heavily upon the drive cones after the finder wheel has found their stem indent and may, therefore, be rocked or shifted by said cones in a manner that may harmfully interfere with the final suture-finding phase of the orienting operations provided by the machine of our invention. With the guard railing 188' sufficiently far removed from the finder wheel, as illustrated in Figures 32 and 33, large fruit, upon dropping with its stem indent over the finder wheel will tip forwardly over said wheel and come to rest against said guard railing 188' in a position permanently removed from the action of the drive cones so that the subsequent suture finding operation may occur without interference from said drive cones. Figure 32 illustrates in phantom lines the position which a large sized fruit may assume upon the modified orienting unit 125' as a result of the described arrangement of the guard railing 188', after the finder wheel has found the stem indent of said fruit. It demonstrates clearly how the sickle shaped plate 188' holds the fruit in a position in which it is out of contact with the drive cones so that said cones are unable to unfavorably affect the suture finding operation.

It remains to add that while we have shown a particularly ingenious arrangement for automatically transferring the fruit from the orienting machine to its next processing station, it will be understood that the orienting machine of the present invention may be associated with other transfer mechanism of a type adapted to preserve the oriented position of the fruit during the transfer operation.

Having thus described the present invention and the manner in which it is to be performed, what we claim as new and desire to protect by Letters Patent is:

1. In combination, continuously moving peach supporting means, means movable with said supporting means for rotating the peach to orient the stem indent to a predetermined position, a continuously moving conveyer, transfer means operable in timed relation to said continuously moving peach supporting means, and said second conveyer to transfer the peach so oriented from the supporting means to the conveyer to present the peach to the second conveyer in a predetermined oriented position relative thereto.

2. In combination, continuously moving peach supporting means, means within said supporting means and carried thereby for engaging a peach therein to rotate the peach supported thereby, stem indent engaging means operably associated with the rotating means and carried by the movable supporting means for engaging the stem indent of the peach while it is rotated to determine the position of orientation of the peach in said supporting means from the stem indent thereof, a continuously moving conveyor, means carried by the continuously moving conveyer for receiving a peach in oriented position and presenting the same to a halving means for halving the fruit so oriented, transfer means operable in timed relation to said continuously moving peach supporting means, and the conveyer means to transfer the peach so oriented from the supporting means to the fruit receiving means of the conveyer in the position of orientation determined in said fruit supporting means.

3. In combination, a first conveyer having spaced whole peach supporting means movable in an endless path, means for continuously moving said first conveyer, a second conveyer having spaced peach supporting means movable in an endless path, means for continuously moving said second conveyer, means for feeding a succession of whole peaches one to each supporting means of the first conveyer, means for orienting each peach while so carried by the first conveyer, said orienting means positioning the suture plane of each peach in a predetermined plane while so conveyed, transfer means including mechanism for abducting an oriented peach from each peach supporting means of the first conveyer and for automatically feeding said peach so oriented to the peach supporting means of the second conveyer, said peach supporting means of the second conveyer including mechanism operating to maintain the oriented position of the peach conveyed to the supporting means of the second conveyer.

4. In combination, a first conveyer having whole peach supporting means movable with the first conveyer in an endless path, means for continuously moving said first conveyer, the peach supporting means including means engaging the periphery of the peach to rotate the same within the supporting means to oriented position, a stem indent finder carried by the supporting means in position to find the stem indent of the peach while the same is rotated within the supporting means, a second conveyer having spaced peach receiving means, means for continuously moving said second conveyer in an endless path, means for feeding a succession of whole peaches one to each supporting means of the first conveyer, transfer means operating in timed relation with the first and second conveyer, said transfer means including means for abducting an oriented peach from each peach supporting means of the first conveyer and presenting the same to a peach supporting means of the second conveyer in oriented position, said transfer means including mechanism operating to grip a whole peach and the fruit supporting means of the first conveyer in oriented position to maintain said whole peach in said oriented position and to transfer the peach in said oriented position to the supporting means of the second conveyer.

5. A transfer station for a fruit orienting machine possessing a plurality of fruit orienting units arranged for movement in a horizontal plane, said station including a turret arranged for rotary movement in a vertical plane above the path of said orienting units, a plurality of transfer units supported from said turret, each comprising a pair of pivotally mounted downwardly directed grasping arms, spring means arranged to urge said arms in an open position, a compressible link operatively associated with said arms, and a control mechanism composed of a shaft journalled in and projecting beyond the walls of each unit, a camming arm firmly mounted upon said shaft interiorly of said unit and adapted to act upon said link, and an actuating arm firmly mounted upon said shaft exteriorly of said unit, said control mechanism being automatically operable from an idle position in which the grasping arms are at their greatest distance from each other to an operative position in which said camming arm forces said link to urge said grasping arms toward one another, means for turning said turret while maintaining the grasping arms of all of said transfer units in a downwardly directed position arranged to straddle the path of said orienting units, and a stationary abutment placed into the path of said actuating arms at a point near the bottom of the circular course of said transfer units and adapted to engage said actuating arms and cam said control mechanisms into said operative position.

6. Arrangement according to claim 5 wherein the control mechanism of said transfer units possesses a second actuating arm firmly mounted upon said shaft exteriorly of its respective transfer unit, and including a second stationary abutment provided at a point angularly displaced from said first abutment in the direction of movement of said transfer units and adapted to engage said second actuating arms and return said control mechanisms to said idler position.

7. Peach orienting and feeding means, comprising: a pair of spaced conveyors moving continuously at a uniform rate, means associated with one of said conveyors for rotating the peach to orient the stem indent thereof into a predetermined position, and a transfer mechanism between said conveyors transverse to the path of movement of said one conveyor, means carried by said transfer mechanism for abducting an oriented peach from the orienting means of said one conveyor and for delivering it to the second conveyor with its stem indent in predetermined oriented position.

8. Peach processing mechanism comprising: peach orienting means having a long axis shaped to project to its maximum extent into the long axis of a whole peach when the peach is supported thereon and when so supported the long axis of the stem indent registers with the long axis of the orienting means, means for moving the orienting means from a peach receiving station to a peach discharge station, means operable to shift the peach and its underlying orienting means relatively during movement of the orienting means to its peach discharge station to orient the suture plane of the peach with a predetermined plane through the long axis of the orienting means, whole peach conveying means for abducting the so oriented peach and for conveying the peach thus oriented to a processing station with the suture plane in a predetermined plane.

References Cited in the file of this patent

UNITED STATES PATENTS

| | | |
|---|---|---|
| 115,626 | McKenzie | June 6, 1871 |
| 1,484,259 | Fowle | Feb. 19, 1924 |
| 1,835,570 | Lorenz | Dec. 8, 1931 |
| 1,867,389 | Sylvester | July 12, 1932 |
| 2,161,750 | Schonwald | June 6, 1939 |
| 2,398,780 | Ewald | Apr. 23, 1946 |
| 2,556,122 | Thompson | June 5, 1951 |
| 2,563,443 | Wormser | Aug. 7, 1951 |
| 2,578,733 | Nordquist | Dec. 18, 1951 |